US007343455B2

(12) United States Patent
Bell, Jr. et al.

(10) Patent No.: US 7,343,455 B2
(45) Date of Patent: Mar. 11, 2008

(54) CACHE MECHANISM AND METHOD FOR AVOIDING CAST OUT ON BAD VICTIM SELECT AND RECYCLING VICTIM SELECT OPERATION

(75) Inventors: Robert H. Bell, Jr., Austin, TX (US); Guy Lynn Guthrie, Austin, TX (US); William John Starke, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 421 days.

(21) Appl. No.: 11/054,394

(22) Filed: Feb. 9, 2005

(65) Prior Publication Data

US 2006/0179235 A1 Aug. 10, 2006

(51) Int. Cl.
*G06F 12/00* (2006.01)

(52) U.S. Cl. .................................................... 711/136

(58) Field of Classification Search ................ 711/128, 711/134, 136

See application file for complete search history.

(56) References Cited

U.S. PATENT DOCUMENTS

| | | | | |
|---|---|---|---|---|
| 4,991,081 | A | 2/1991 | Bosshart | |
| 5,249,286 | A | 9/1993 | Alpert et al. | |
| 5,353,425 | A | 10/1994 | Malamy et al. | |
| 5,493,667 | A | 2/1996 | Huck et al. | |
| 5,594,886 | A | 1/1997 | Smith et al. | |
| 5,666,482 | A * | 9/1997 | McClure | 714/8 |
| 5,715,427 | A | 2/1998 | Barrera et al. | |
| 5,778,430 | A | 7/1998 | Ish et al. | |
| 5,781,924 | A | 7/1998 | Zaitzeva et al. | |
| 5,913,224 | A | 6/1999 | MacDonald | |
| 5,963,972 | A | 10/1999 | Calder et al. | |
| 5,974,508 | A | 10/1999 | Maheshwari | |
| 6,161,167 | A * | 12/2000 | Witt | 711/136 |
| 6,434,670 | B1 | 8/2002 | Arimilli et al. | |
| 6,725,341 | B1 | 4/2004 | Peir et al. | |
| 6,738,888 | B2 | 5/2004 | Chauvel | |
| 6,745,291 | B1 | 6/2004 | York | |
| 6,760,829 | B2 | 7/2004 | Lasserre et al. | |
| 6,823,427 | B1 | 11/2004 | Sander et al. | |
| 6,848,024 | B1 | 1/2005 | Rowlands et al. | |
| 6,901,483 | B2 | 5/2005 | Robinson et al. | |
| 6,904,501 | B1 | 6/2005 | Zhang et al. | |
| 6,986,001 | B2 * | 1/2006 | Zhang | 711/133 |
| 6,993,628 | B2 | 1/2006 | Starke et al. | |
| 6,996,679 | B2 | 2/2006 | Cargnoni et al. | |
| 7,039,760 | B2 | 5/2006 | Arimilli et al. | |
| 2004/0268099 | A1 | 12/2004 | Smith et al. | |

* cited by examiner

*Primary Examiner*—Hiep T. Nguyen
(74) *Attorney, Agent, or Firm*—Diana R. Gerhardt; Dillon & Yudell LLP

(57) ABSTRACT

A method, apparatus, and computer for identifying selection of a bad victim during victim selection at a cache and recovering from such bad victim selection without causing the system to crash or suspend forward progress of the victim selection process. Among the bad victim selection addressed are recovery from selection of a deleted member and recovery from use of LRU state bits that do not map to a member within the congruence class. When LRU victim selection logic generates an output vector identifying a victim, the output vector is checked to ensure that it is a valid vector (non-null) and that it is not pointing to a deleted member. When the output vector is not valid or points to a deleted member, the LRU victim selection logic is triggered to re-start the victim selection process.

6 Claims, 18 Drawing Sheets

| | | | | | | | |
|---|---|---|---|---|---|---|---|
| 000000 | victim = D | 010000 | victim = D | 100000 | victim = D | 110000 | victim = D |
| 000001 | victim = C | 010001 | Error | 100001 | victim = C | 110001 | Error |
| 000010 | Error | 010010 | Error | 100010 | Error | 110010 | Error |
| 000011 | victim = C | 010011 | Error | 100011 | victim = C | 110011 | Error |
| 000100 | victim = D | 010100 | victim = D | 100100 | victim = D | 110100 | victim = D |
| 000101 | Error | 010101 | Error | 100101 | Error | 110101 | Error |
| 000110 | victim = B | 010110 | victim = B | 100110 | Error | 110110 | Error |
| 000111 | victim = B | 010111 | victim = B | 100111 | Error | 110111 | Error |
| 001000 | Error | 011000 | Error | 101000 | Error | 111000 | victim = A |
| 001001 | victim = C | 011001 | Error | 101001 | victim = C | 111001 | victim = A |
| 001010 | Error | 011010 | Error | 101010 | Error | 111010 | victim = A |
| 001011 | victim = C | 011011 | Error | 101011 | victim = C | 111011 | victim = A |
| 001100 | Error | 011100 | Error | 101100 | Error | 111100 | victim = A |
| 001101 | Error | 011101 | Error | 101101 | Error | 111101 | victim = A |
| 001110 | victim = B | 011110 | victim = B | 101110 | Error | 111110 | victim = A |
| 001111 | victim = B | 011111 | victim = B | 101111 | Error | 111111 | victim = A |

*FIG. 11*

CACHE MECHANISM AND METHOD FOR AVOIDING CAST OUT ON BAD VICTIM SELECT AND RECYCLING VICTIM SELECT OPERATION

CROSS REFERENCE TO RELATED APPLICATION(S)

The present invention is related to the following commonly assigned, co-pending applications: "Cache Member Protection with Partial Make MRU Allocation," Ser. No. 11/054,390, and Method and "Pipelining D States for MRU Steerage During MRU/LRU Member Allocation," Ser. No. 11/054,067, both filed concurrently herewith; and "Cache Allocation Mechanism for Biasing Subsequent Allocations Based Upon Cache Directory State," Ser. No. 10/425,459. The contents of the above applications are incorporated herein by reference.

BACKGROUND OF THE INVENTION

1. Technical Field

The present invention relates generally to an improved data processing system, and in particular, to an improved method and apparatus for caching data in a memory. Still more particularly, the present invention relates to a method and computer system design for handling bad victim selection during LRU victim selection at a caching mechanism.

2. Description of Related Art

Most early data processing systems consisted basically of a central processing unit, a main memory, and some sort of secondary input/output ("I/O") capability. In these earlier systems, the main memory was the limiting element. Typically, the main memory was designed first and the CPU was then created to match the speed of the memory. This matching was performed to optimize the processing speed and is necessary even with today's high speed computers. Over time, logic circuit speeds increased along with the capacity requirements of main memory. With the need for increasing capacity in the main memory, the speed of the main memory could not keep up with the increasing speed of the CPU. Consequently, a gap developed between the main memory and the processor cycle time, which resulted in un-optimized processing speeds. As a result, a cache memory was developed to bridge the gap between the memory and the processor cycle time.

Using a cache to bridge the performance gap between a processor and main memory has become important in data processing systems of various designs, from personal computers to work stations to data processing systems with high performance processors. A cache memory is an auxiliary memory that provides a buffering capability through which a relatively slow main memory can interface with a processor at the processor's cycle time to optimize the performance of the data processing system. Requests are first sent to the cache to determine whether the data or instructions requested are present in the cache memory. A "hit" occurs when the desired information is found in the cache. A "miss" occurs when a request or access to the cache does not produce the desired information. In response to a miss, one of the cache "lines" is replaced with a new one. The method to select a line to replace is called a replacement policy.

A number of different schemes for organizing a cache memory exist. For example, a fully associative mapping organization may be employed whereby a data address may exist in any location in the cache, or a direct mapping scheme may be employed in a cache memory whereby a data address may exist in only one location in the cache. A set associative scheme may be employed by partitioning the cache into distinct classes of lines, wherein each class contains a small fixed number of lines. This approach is somewhere between a direct mapped and a full associative cache. The classes of lines are usually referred to as "congruence classes." The lines in a congruence class are usually referred to as sets (which indicate the number of locations an address can reside) in a congruence class in a set associative cache.

One generally used type of replacement policy is the least recently used (LRU) policy. An LRU policy is built upon the premise that the least recently used cache line in a congruence class is the least worthy of being retained. So, when it becomes necessary to evict a cache line to make room for a new one, an LRU policy chooses as a victim a cache line which is the least recently accessed set (or member) within a congruence class.

For an LRU policy, two types of operations must be carried out against the LRU state (which is maintained for each congruence class in a cache).

A most recently used-update (MRU-update) operation typically occurs due to a cache hit. It adjusts the LRU state such that the "hit" member is ordered ahead of all other members in that congruence class, establishing the cache line in that member position as the most worthy member in the congruence class.

A least recently used-victim-selection (LRU-victim-selection) operation typically occurs when a cache miss requires that a member be allocated to hold a cache line arriving from elsewhere in the storage hierarchy. The operation determines which cache line is the least worthy of being retained in the congruence class, evicts that cache line, and places the newly arriving cache line in its member position.

Often, favorable operating characteristics and reduced complexity implementations for a cache can be achieved when the victim selection and state update portions of a cache allocation policy are tightly integrated with a common pipeline for accessing the cache arrays, directory arrays, and allocation policy (e.g. LRU) state arrays.

Further, in such implementations, further benefits are typically derived when the victim selection occurs as early as possible in the common pipeline, and when for each operational use of the pipeline, at most one cache allocation policy state update is performed.

Selection of Bad Victims:

(1) Unresolved/Unassigned Chronology State Bit Combinations

Various types of errors may occur while performing LRU victim selection from the cache. One error in particular occurs when, as with most conventional caching mechanisms, chronology vectors are utilized to select the LRU victim member. With the use of chronology vectors, an N bit vector yields $2^N$ possible combinations of the N bits. For example, a 6 bit chronology vector (ordering cache members ABCD) provides 64 possible combinations. However, only a subset of the total number of vector combinations is actually valid. In the 6 bit chronology vector example, only 24 of the 64 combinations are actually valid combinations for ordering cache members ABCD.

The list of possible permutations with the 6 bits and indication of the valid permutations for victim selection are illustrated by the table of FIG. 11. As shown therein, a total of 32 correct states are provided and 32 error states. In actuality, there are only 24 correct encodings/states for LRU victim selection and 40 error states. The other 8 states labeled as "correct" states refer to non-LRU victims, i.e. referring to one of the other 3 members that are not actually the LRU member.

While the chronology vectors (LRU state bits) are stored within the LRU state array, one or more of the LRU state bits may be flipped (i.e., value changed from 1 to 0 or vice versa), such that the resulting combination of bits does not yield one of the 24 valid permutations (i.e., the chronology vector does not point to one of the members of the congruence set) or the resulting combination points to a deleted member (i.e., a member in the D-state, as described below). This flipping of the bit within the array may be caused by an alpha particle hitting the array, for example. When this invalid/unassigned combination is fed into the conventional LRU victim selection process, an 8-bit null output vector (i.e., all 0s) is provided from the LRU victim selection logic. This null output causes the victim selection mechanism to break down.

(2) D-State Members

As microprocessor chip fabrication technology advances toward smaller and smaller feature sizes, defect tolerance becomes more and more of a primary concern. Occasionally, the physical structure of chip at which a cache line is located becomes corrupted and is not able to be allocated to an incoming cache line.

One method for tolerating defects in these cells is to identify cache line compartments in the cache that have manufacturing defects, and mark those compartments as "deleted", so they will not be used, and hence, will not introduce errors into the data that would have been stored therein. One technique for marking compartments as "deleted" is to define a cache state (which is called "D", meaning deleted) that will be stored in the cache directory entry corresponding to a given defective compartment. Unlike normal cache states, such as those included in standard MESI or similar protocols, which describe the coherence attributes of the cache line contained in a given compartment, the D-state indicates that any data contained in the compartment is invalid, and further indicates to the cache replacement policy logic that the compartment is unavailable for allocation.

During typical LRU victim allocation, however, cache lines in the D state are still represented within the LRU state array and may easily be selected as the LRU victim since the line is not being used and thus appears to be stale (or LRU). However, selection of a Deleted line causes a fault condition at the cache and may result in a crash of the entire processing system.

A few methods/mechanisms have therefore been proposed to prevent the selection of a line in the D state during LRU victim selection. However, most of these techniques do not directly address or correct the selection of a Deleted member as the victim, where the selection is due to errors resulting from the chronology bits within the LRU state array being flipped to point to the Deleted member.

Selection of either an unassigned combination of LRU state bits or a member in the deleted state are referred to as bad victim selection, which is an undesirable condition. When a bad victim is selected, an error state is registered, and the system records a fault, which may be fatal and cause the system to crash. Therefore, it would be advantageous to have an improved method, apparatus, and computer for effectively handling selection of a bad victim during the victim selection process at the cache.

SUMMARY OF THE INVENTION

Disclosed are a method, apparatus, and computer for identifying selection of a bad victim during victim selection at a cache and recovering from such bad victim selection without causing the system to crash or suspend forward progress of the victim selection process. Among the bad victim selection addressed are recovery from selection of a deleted member and recovery from not selecting a member due to use of chronology vectors (or LRU state bits) that do not map to a member in the congruence class.

When LRU victim selection logic generates an output vector identifying a victim, the output vector is checked to ensure that is a valid vector (non-null) and that it is not pointing to a deleted member. LRU victim selection logic receives an additional input, referred to as LRU mode input, and generates an output vector, which is forwarded to error checking logic. Error tracking logic determines whether the selected victim is a bad victim or a valid victim.

When the output vector is not valid or points to a deleted member, the LRU victim selection logic is triggered to re-start the victim selection process. Contemporaneously, the current victim selection process is aborted, and the resulting output vector discarded. A random vector generator is provided within the LRU victim selection logic, and during the restart, a victim vector that includes a randomly selected member victim is selected over the victim identified by the LRU state bits.

Random selection of a member as a victim and generating a corresponding victim vector overrides the use of the LRU state bits, which may have cause the previous bad victim selection. The process of recycling and picking of random victims is repeated until a valid victim member is eventually selected.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 11 is a table illustrating the 64 possible permutations of 6 chronology bits and valid/error identification according to convention art;

DETAILED DESCRIPTION OF AN ILLUSTRATIVE EMBODIMENT

Figure 1:
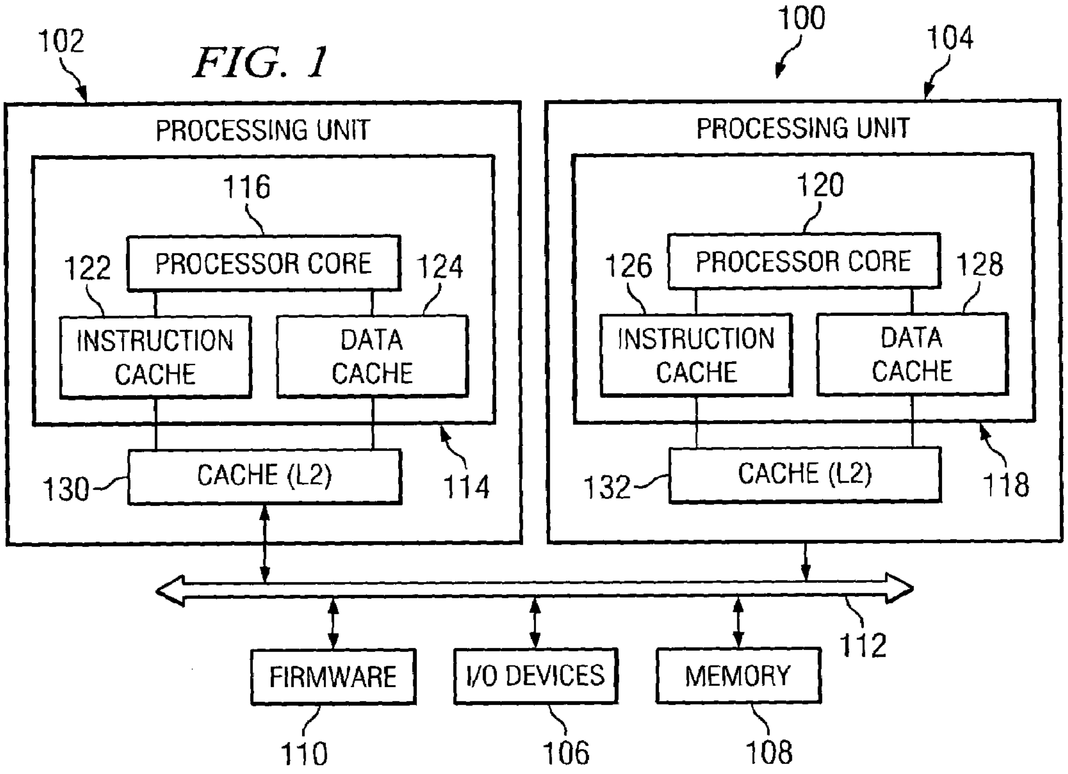
FIG. 1 is a block diagram of a data processing system in which a preferred embodiment of the present invention may be implemented.

With reference now to the figures and in particular with reference to FIG. 1, a block diagram of a data processing system is depicted in which a preferred embodiment of the present invention may be implemented. As illustrated, Data processing system 100 is an example of a conventional multi-processor computer system. Data processing system 100 has several processing units, two of which, processing unit 102 and processing unit 104 are depicted. These processing units are connected to various peripheral devices, including input/output (I/O) devices 106 used to communicate with a user, memory 108 used by the processing units to carry out program instructions, and firmware 110 whose primary purpose is to seek out and load an operating system from one of the peripherals whenever the computer is first turned on. I/O devices 106 may take various forms, such as a display monitor, keyboard, and permanent storage device.

Processing units 102 and 104 communicate with the peripheral devices by various means, including, for example, a generalized interconnect or bus 112. Data processing system 100 may have many additional components which are not shown, such as serial and parallel ports for connection to devices, such as modems or printers. Those of ordinary skill in the art will further appreciate that there are other components that might be used in conjunction with those shown in the block diagram of FIG. 1. For example, a display adapter might be used to control a video display monitor, and a memory controller may be used to access memory 108. The data processing system also can have more than two processing units.

In a symmetric multi-processor (SMP) computer, all of the processing units are generally identical. In other words, the processors all use a common set or subset of instructions and protocols to operate, and generally have the same architecture. A typical architecture is shown in FIG. 1. In these examples, a processing unit 102 includes integrated chip 114, which contains processor core 116, and processing unit 104 contains integrated circuit 118, which contains processing core 120, instruction cache 126, and data cache 128. Processor cores 116 and 120 include registers and execution units. These components are used to carry out program instructions to operate data processing system 100.

As illustrated, processing unit 102 and processing unit 104 also include caches, such as instruction cache 122, data cache 124, instruction cache 126, and data cache 128, within integrated circuits 114 and 118 in FIG. 1. These caches are implemented using high speed memory devices. Caches are commonly used to temporarily store values that might be repeatedly accessed by a processor, to speed up processing by avoiding the longer latency of loading the values from memory 108. These caches also are referred to as "on-board" when they are integrally packaged with the processor core on a single integrated chip. In these examples, the caches located within integrated circuit 114 and integrated circuit 118 are level 1 (L1) caches. Each cache is associated with a cache controller (not shown) that manages the transfer of data between the processor core and the cache memory.

A processing unit can include additional caches. For example, processing unit 102 includes cache 130 and processing unit 104 includes cache 132, which are referred to as level 2 (L2) caches because these memories support the on-board or L1 caches. In other words, cache 130 and cache 132 act as intermediaries between memory 108 and the on-board L1 caches: instruction cache 122, data cache 124, instruction cache 126, and data cache 128. These L2 caches can store a much larger amount of information, such as instructions and data, than the on-board caches can, but with a longer access penalty. For example, cache 130 and cache 132 may be integrated in chips having a storage capacity of 256 or 512 kilobytes, while instruction cache 122 and data cache 124 in processing unit 102 and instruction cache 126 and data cache 128 in processing unit 104 may have 64 kilobytes of total storage.

As illustrated, both cache 130 and 132 are connected to bus 112. All loading of information from memory 108 into processor core 116 passes through cache 130, while all loading of information into processor core 120 passes through cache 132. Although FIG. 1 depicts only a two-level cache hierarchy, multi-level cache hierarchies can be provided where there are many levels of serially connected caches. For example, L3, L4, and L5 caches may be used.

In an SMP computer, providing a coherent memory system is important. In other words, it is important to cause write operations to each individual memory location to be serialized in some order for all processors. For example, assume a location in memory is modified by a sequence of write operations to take on the values: 1, 2, 3, 4. In a cache coherent system, all processors will observe the writes to a given location to take place in the order shown. However, it is possible for a processing element to miss a write to the memory location. A given processing element reading the memory location could see the sequence 1, 3, 4, missing the update to the value 2. A system that implements these properties is said to be "coherent". Virtually all coherency protocols operate only to the granularity of the size of a cache block. That is to say, the coherency protocol controls the movement of and write permissions for data on a cache block basis and not separately for each individual memory location.

A number of protocols and techniques for achieving cache coherence are known. At the heart of all these mechanisms for maintaining coherency is the requirement that the protocols allow only one processor to have a "permission" that allows a write to a given memory location (cache block) at any given point in time. As a consequence of this requirement, whenever a processor attempts to write to a memory location, the processor must first inform all other processors of its desire to write the location and receive permission from all other processors to carry out the write. The key issue is that all other processors in the system must be informed of the write by the initiating processor before the write occurs. Furthermore, if a block is present in the L1 cache of a given processing unit, this block is also present in the L2 and L3 caches of that processing unit. This property is known as inclusion and is well known to those skilled in the art.

To implement cache coherency in a system, the processors communicate over a common generalized interconnect, such as bus 112. The processors pass messages over the interconnect indicating their desire to read or write memory locations. When an operation is placed on the interconnect, all of the other processors "snoop" (monitor) this operation and decide if the state of their caches can allow the requested operation to proceed and if so, under what conditions. There are several bus transactions that require snooping and follow-up action to honor the bus transactions and maintain memory coherency. The snooping operation is triggered by the receipt of a qualified snoop request, generated by the assertion of certain bus signals. Instruction processing is interrupted only when a snoop hit occurs and the snoop state machine determines that an additional cache snoop is required to resolve the coherency of the offended sector.

Figure 2:
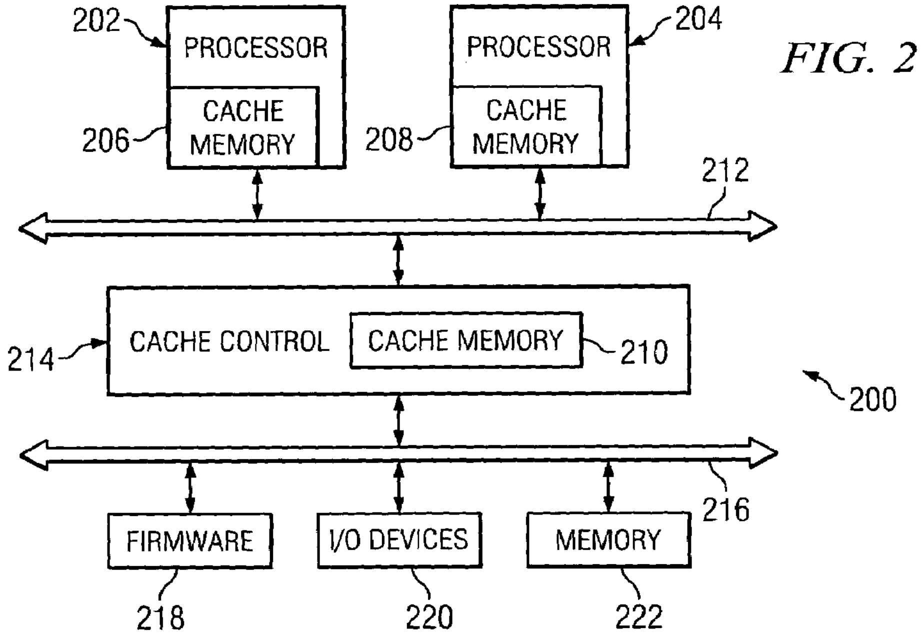
FIG. 2 is a diagram of another data processing system in which the present invention may be implemented.

With reference now to FIG. 2, a diagram of another data processing system is depicted in accordance with a preferred embodiment of the present invention. The processes and apparatus of the present invention may also be implemented within data processing system 200. This particular example, illustrated a shared L2 cache, while data processing system 100 in FIG. 1 illustrated unshared caches.

In this example, data processing system 200 includes two processors, processor 202 and processor 204. Cache memory 206 and cache memory 208 are cache memories located within processor 202 and processor 204, respectively. In this example, cache memory 210 is a level 2 cache memory that is shared by both processors. Access to this cache memory is provided by bus 212. Cache control 214 contains the logic for handling cache lines within memory 210 in response to requests from processors 202 and 204. Cache control 214 is connected to other components through bus 216. For example, firmware 218, I/O devices 220 and memory 222 are connected to bus 216.

Data processing system 100 and data processing system 200 include mechanisms for handling cache lines. A cache line is a unit of data that is retrieved from memory to a cache. A cache line is typically the smallest unit of data that may be sent from a memory to a cache. The present invention provides a method, apparatus, and computer instructions for supplementing least recently used (LRU) policies applied to handling cache lines in a cache.

An LRU policy, by definition, must maintain an ordered list of all members within each congruence class. A vector of "chronology bits" provides a mechanism for indicating an order amongst multiple entities. The vector consists of one bit for each possible pair of entities. The bit indicates the relative ordering within the pair. That is, for a given pair (i, j) the bit might be set to a "one" value if entity j precedes entity i, and the bit might be cleared to a "zero" value if entity i precedes entity j.

Figure 3:
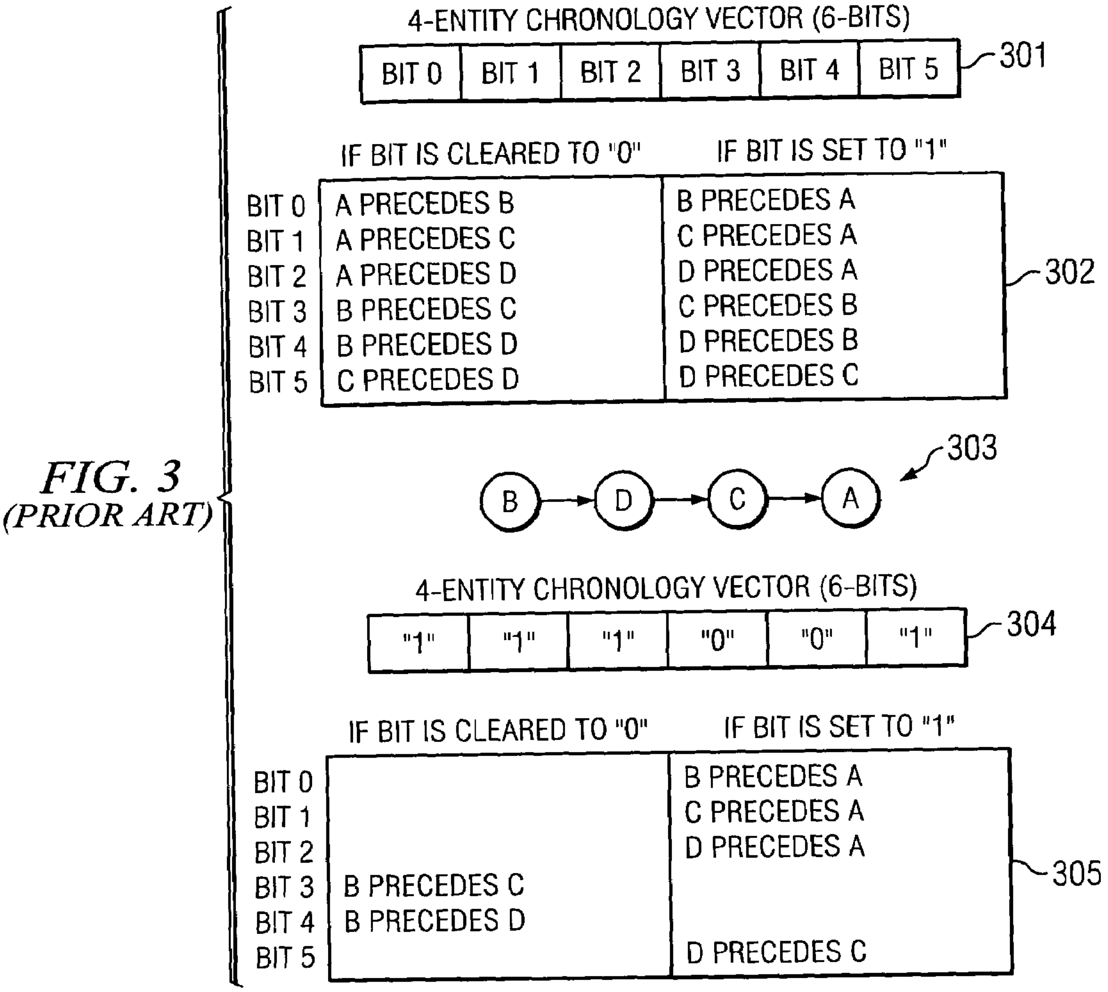
FIG. 3 is a diagram of components used in ordering entities.

For example, referring now to FIG. 3, components used in ordering entities are illustrated. Chronology vector 301 indicates an ordering between four entities (a, b, c, d) and consists of six bits. Referring to table 302, bit 0 indicates the ordering between entities a and b, bit 1 indicates the ordering between entities a and c, bit 2 indicates ordering between a and d, bit 3 indicates ordering for b and c, bit 4 is used in ordering b and d, and bit 5 indicates ordering between c and d.

To specify the ordering of members in ordering 303 as follows: b, d, c, a, the vector 304 would have the value: "111001", indicating an order specified by the rules 305 for each chronology bit. In general, a vector of chronology bits for determining the ordering amongst n entities requires $(n\times(n-1))/2$ bits.

Applying this technique to implement a "true" LRU policy for a 2-way associative cache requires a 1-bit vector; or for a 3-way cache requires a 3-bit vector; or 4-way: 6-bits; or 5-way: 10-bits; or 8-way: 28-bits; or 16-way: 120-bits.

While chronology bits do not provide the most efficient possible bit-encoding (e.g., an encoding requiring the smallest number of bits), they do possess attributes ideally suited to a fast and inexpensive circuit implementation.

With a chronology vector implementation, an MRU-update operation is accomplished by setting a subset of the bits in the vector to a constant pattern (associated with the updated member) while leaving the other bits in the vector unchanged. The subset is comprised of the n−1 bits (where n is the associativity of the cache) which define the ordering between the updated member and each of the other members in the congruence class.

Figure 4A:
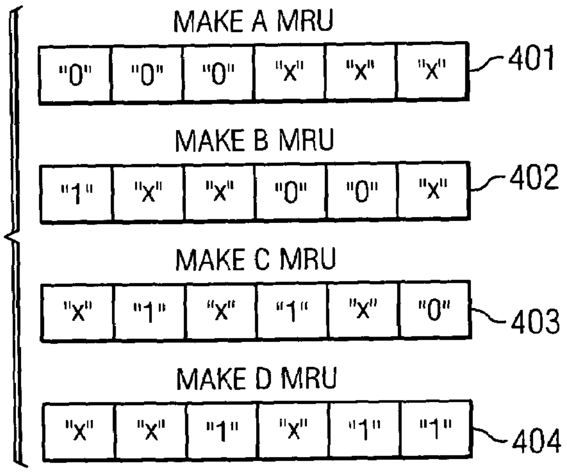
FIG. 4A is a diagram of constant patterns.
Figure 4B:
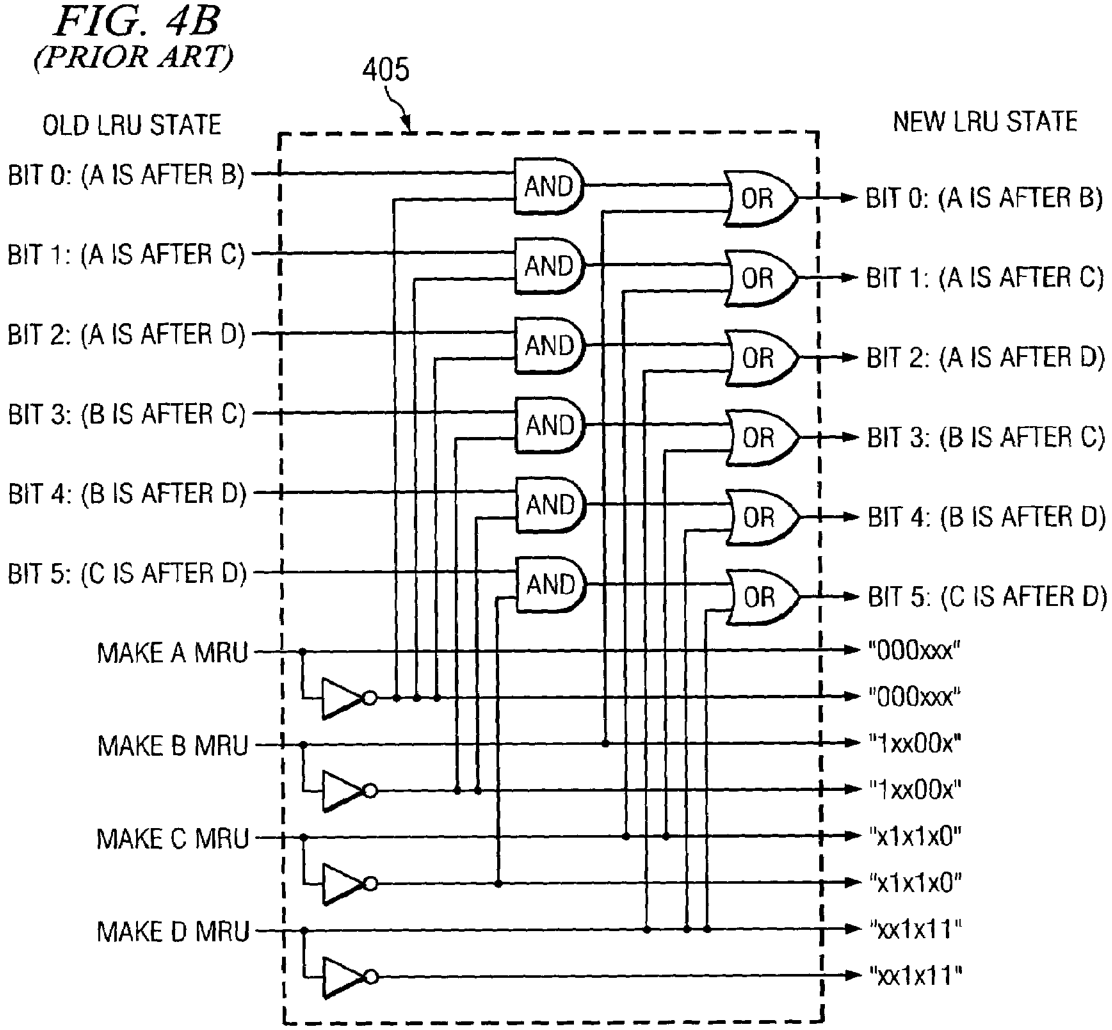
FIG. 4B is a circuit diagram of a known MRU-update function.

For example, referring now to FIG. 4A, the constant patterns are shown for a 401, b 402, c 403, and d 404. Turning next to FIG. 4B, circuit diagram 405 illustrates the MRU-update function in a manner familiar to those skilled in the art. Constant patterns 401, 402, 403, and 404, from FIG. 4A are used to annotate the control lines in circuit diagram 405 in FIG. 4B to associate each constant pattern with the set of control lines that establish that pattern into the LRU state.

With a chronology vector implementation, an LRU-victim-selection operation is accomplished by implementing an equation for each member position. The equation for a given member tests the same subset of n−1 bits (described above) associated with that member in the MRU-update operation, i.e., those bits which define the ordering between the member and each of the other members in the congruence class. The equation compares the tested bits against a constant pattern, returning "true" if there is a match, and returning "false" if there is not a match. As illustrated, one and only one of the equations will return a "true" value. The member position associated with that equation is the victim member position.

Figure 5A:
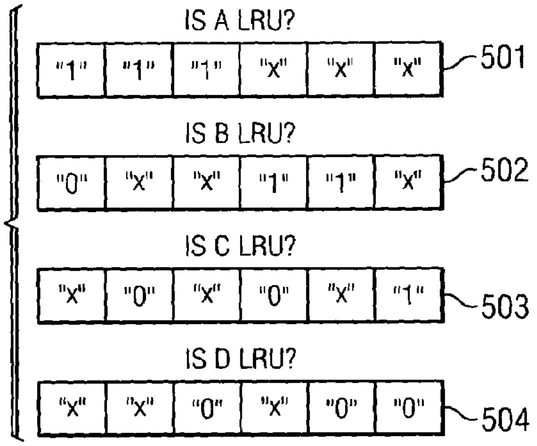
FIG. 5A is a diagram of constant patterns.
Figure 5B:
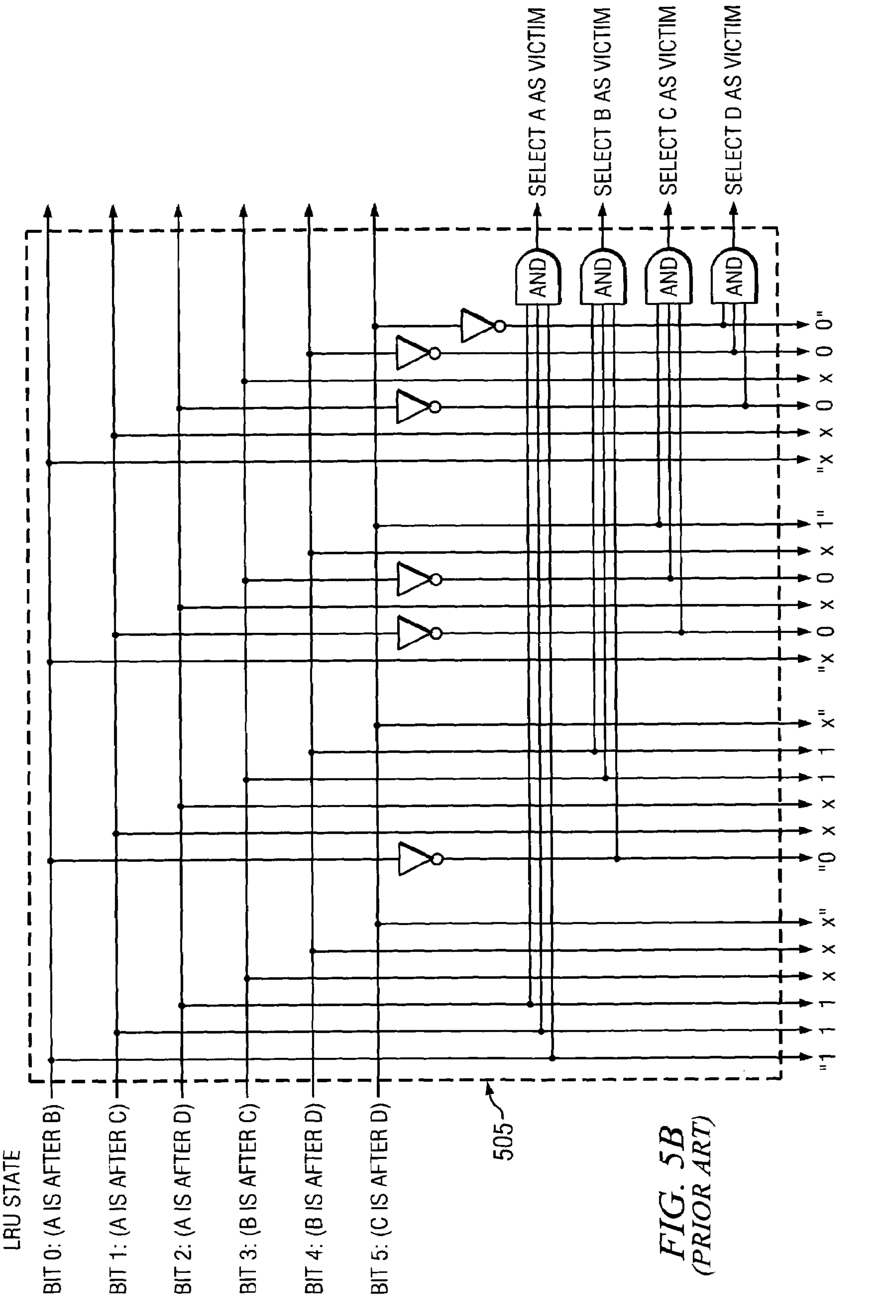
FIG. 5B is a circuit diagram of a known LRU-victim-selection function.

For example, referring now to FIG. 5A, the constant patterns are shown for a 501, b 502, c 503, and d 504. With reference to FIG. 5B, circuit diagram 505 illustrates the LRU-victim-selection function in a manner familiar to those skilled in the art. Constant patterns 501, 502, 503, and 504 from FIG. 5A are used to annotate the information lines in circuit diagram 505 in FIG. 5B to associate each constant pattern with the set of information lines that feeds the constant comparator equation for that pattern.

As associativity increases, the chronology vector technique can become prohibitively expensive. Those skilled in the art will recognize that less expensive "pseudo-LRU" policies are possible, which policies are roughly equal to "true" LRU behavioral value, but may be implemented in hardware with fewer bits required to track LRU state.

One such policy, well known in the art, is the tree-based pseudo-LRU approach. In this hierarchical approach, a set of multiple chronology vectors are organized as a tree of arbitrary depth. For non-leaf nodes of the tree, the number of branches from the node is equal to the number of entities ordered by the vector. Each leaf node of the tree defines the order amongst a subset of the members in a congruence class equal in number to the ordering capacity of the vector.

Figure 6:
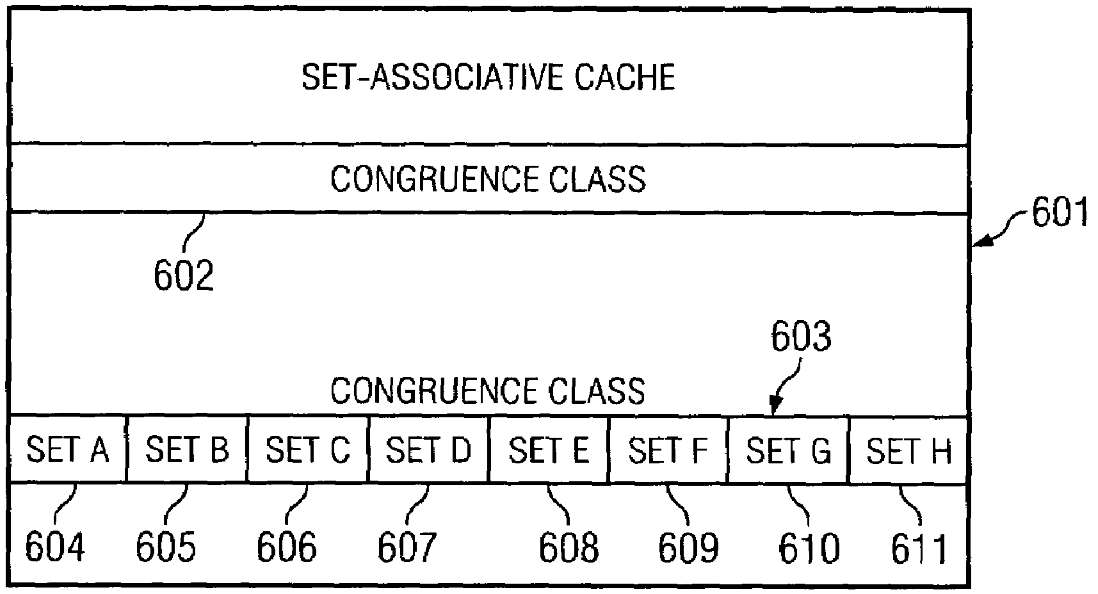
FIG. 6 is a diagram of an 8-way associative cache.

To illustrate this, referring now to FIG. 6, an 8-way associative cache 601 is shown. Cache 601 is comprised of multiple congruence classes 602 and 603, which are typically selected by a subset of the address of the cache line being referenced. Each congruence class is comprised of eight members, member A 604, member B 605, member C 606, member D 607, member E 608, member F 609, member G 610, and member H 611.

Often, tree-based LRU implementations are comprised of single bit (2-entity) chronology vectors. For example, referring now to FIG. 7, examples of tree based LRU structures are illustrated. In this example, vector 700 forms the basis for each node in a binary tree 702, which is 3 levels deep in this example. Binary tree 702 contains nodes 704, 706, 708, 710, 712, 714, and 716. Seven single bit vectors, vectors 718, 720, 722, 724, 726, 728, and 730, are provided to track the state for a binary-tree LRU scheme governing the 8-way associative cache with member positions A 732, B 734, C 736, D 738, E 740, F 742, G 744, and H 746.

Figure 7:
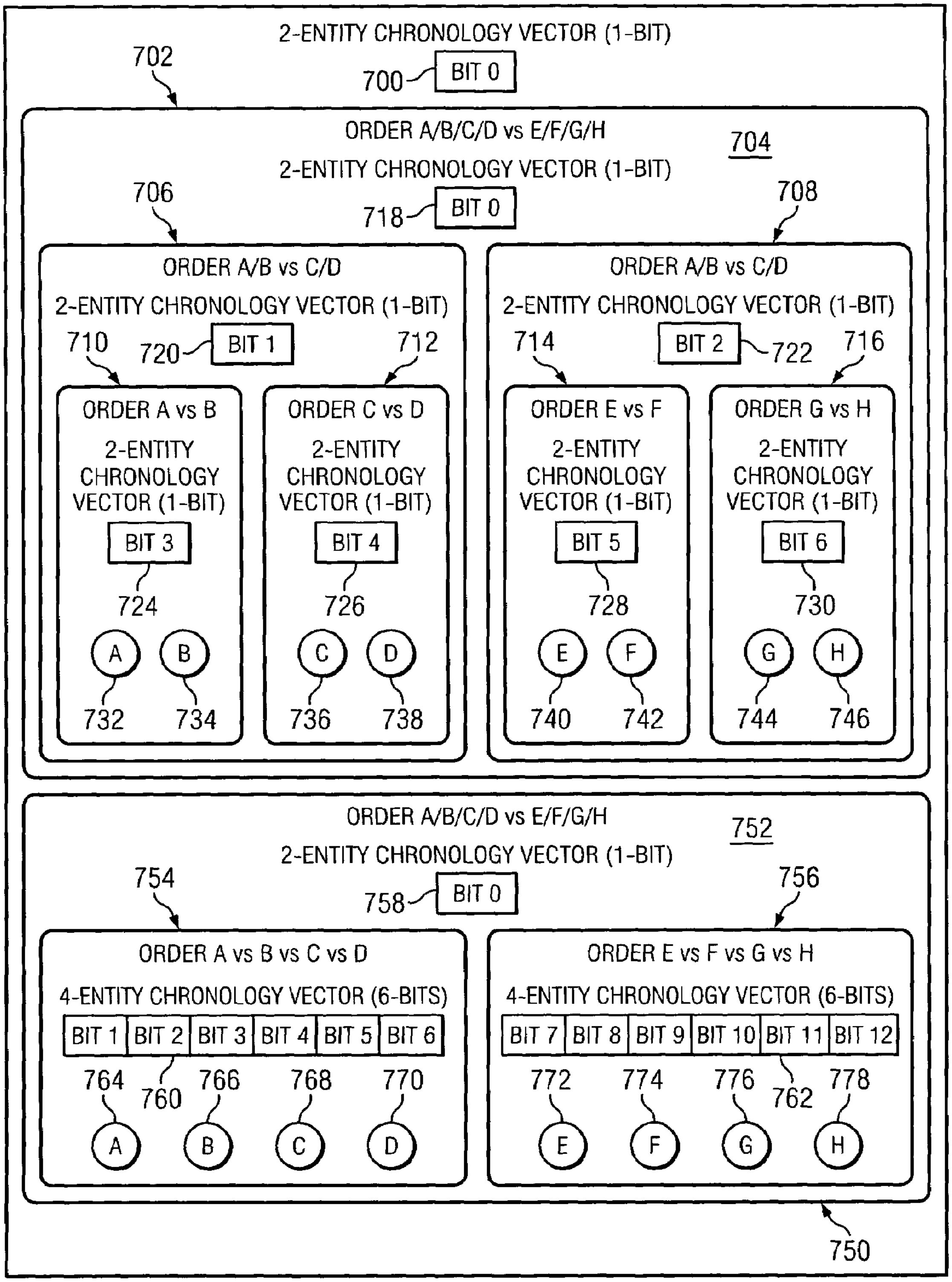
FIG. 7 is a diagram of several examples of tree based LRU structures.

In another example, still referring to FIG. 7, a combination of (2-entity) and (4-entity) vectors are used to construct a different tree-based LRU scheme, as illustrated by tree structure 750 for an 8-way associative cache. In this example, tree structure 750 includes nodes 752, 754, and 756. Node 752 includes one bit chronology vector 758, while node 754 contains six bit chronology vector 760, and node 756 contains six bit chronology vector 762. These vectors are used to point to member positions A 764, B 766, C 768, D 770, E 772, F 774, G 776, and H 778.

The present invention refers to a chronology vector within a tree-structure, such as that of tree structure 750, although multiple different tree configurations are possible. Within the exemplary tree structure, highest level node 752 includes one bit chronology vector 758 that is referred to as the root/control/pointer of the tree, which includes two additional nodes 752 and 754, each having a six bit chronology vector, representing the position of each member within a group relative to each other. Those skilled in the art will appreciate that the functionality/utilization of the two level chronology vector configuration to provide 13 LRU state bits, as described below, may be expanded to other vector configurations.

Figure 8:
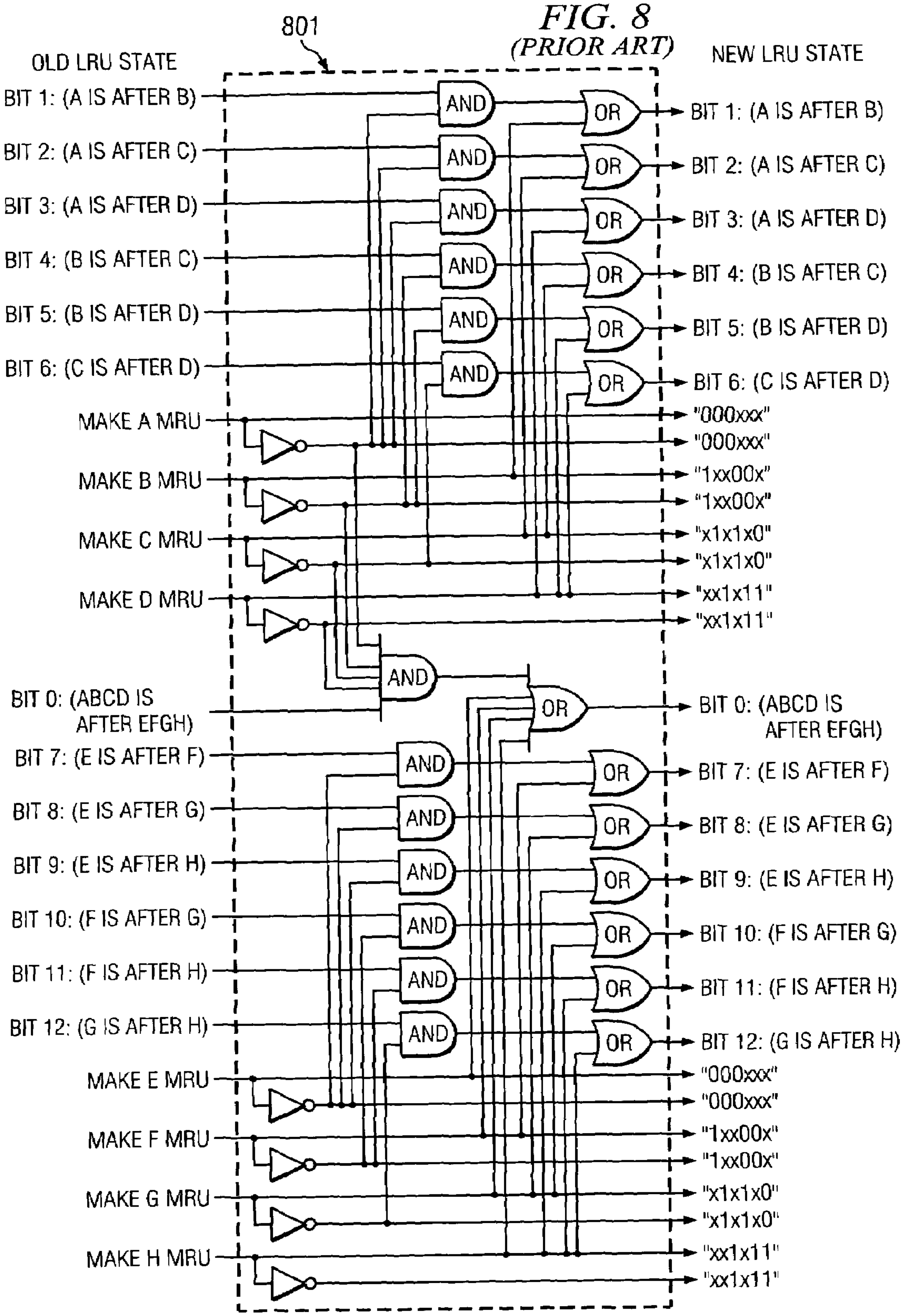
FIG. 8 is a circuit diagram of an MRU-update function.

Referring now to FIG. 8, a circuit diagram 801 illustrates the combination of varying size chronology vectors with a tree-based scheme embodied in an MRU-update function for the tree structure 750 shown in FIG. 7.

Figure 9A:
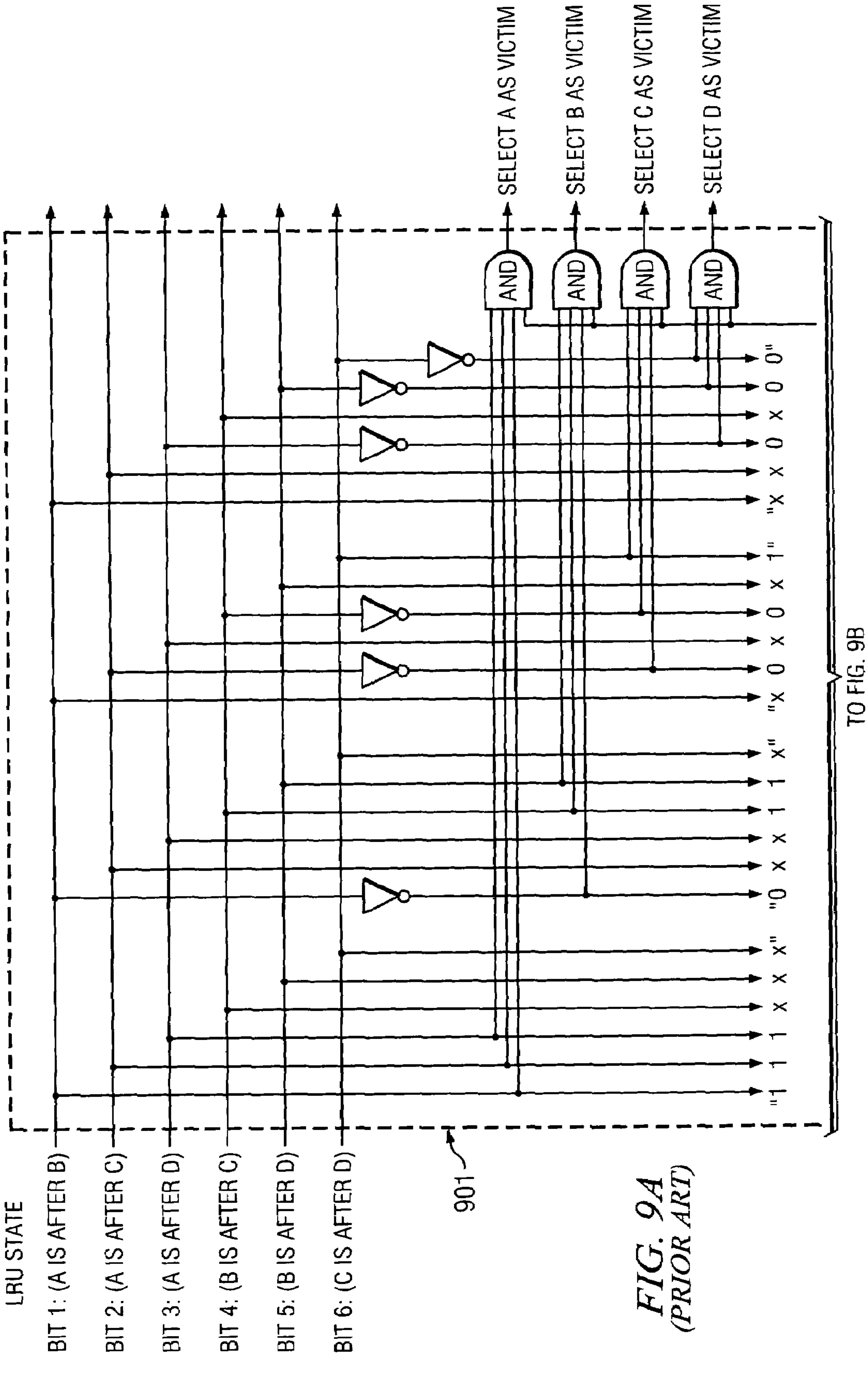
FIG. 9A and FIG. 9B provide a circuit diagram of an LRU victim selection function.
Figure 9B:
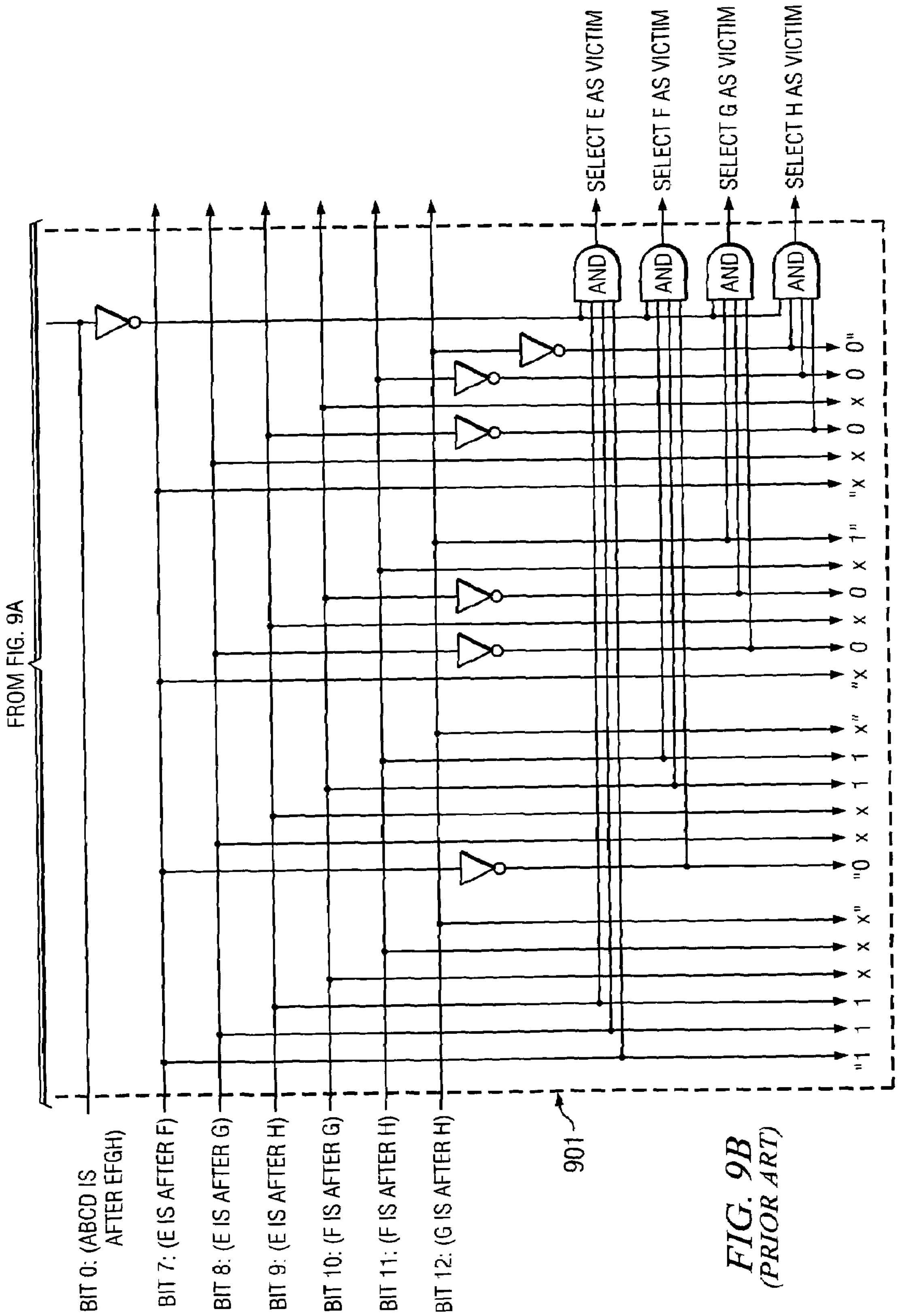

Referring now to FIG. 9A and FIG. 9B, a circuit diagram 901 illustrates the combination of varying size chronology vectors with a tree-based scheme embodied in an LRU victim selection function for the LRU tree 750 shown in FIG. 7.

Often, least recently used victim selection may be augmented in various ways. One such way is with an invalid member select override policy. The coherency state of a given cache line occupying a member in the cache can be useful in determining whether or not that member should be replaced. If the cache line is not valid, it is an ideal candidate for replacement, since nothing is lost when the cache line is over-written by a newly allocated cache line. The invalid member select override policy determines whether an invalid member exists in the congruence class from which a victim must be selected. If one or more such members exist, the policy chooses one of them as a victim, overriding the victim selected by the primary selection policy.

Often, favorable operating characteristics and reduced complexity implementations for a cache can be achieved when the victim selection and state update portions of a cache allocation policy are tightly integrated with a common pipeline for accessing the cache arrays, directory arrays, and allocation policy (e.g. LRU) state arrays.

Further, in such implementations, further benefits are typically derived when the victim selection occurs as early as possible in the common pipeline, and when for each operational use of the pipeline, at most one cache allocation policy state update is performed.

Figure 10:
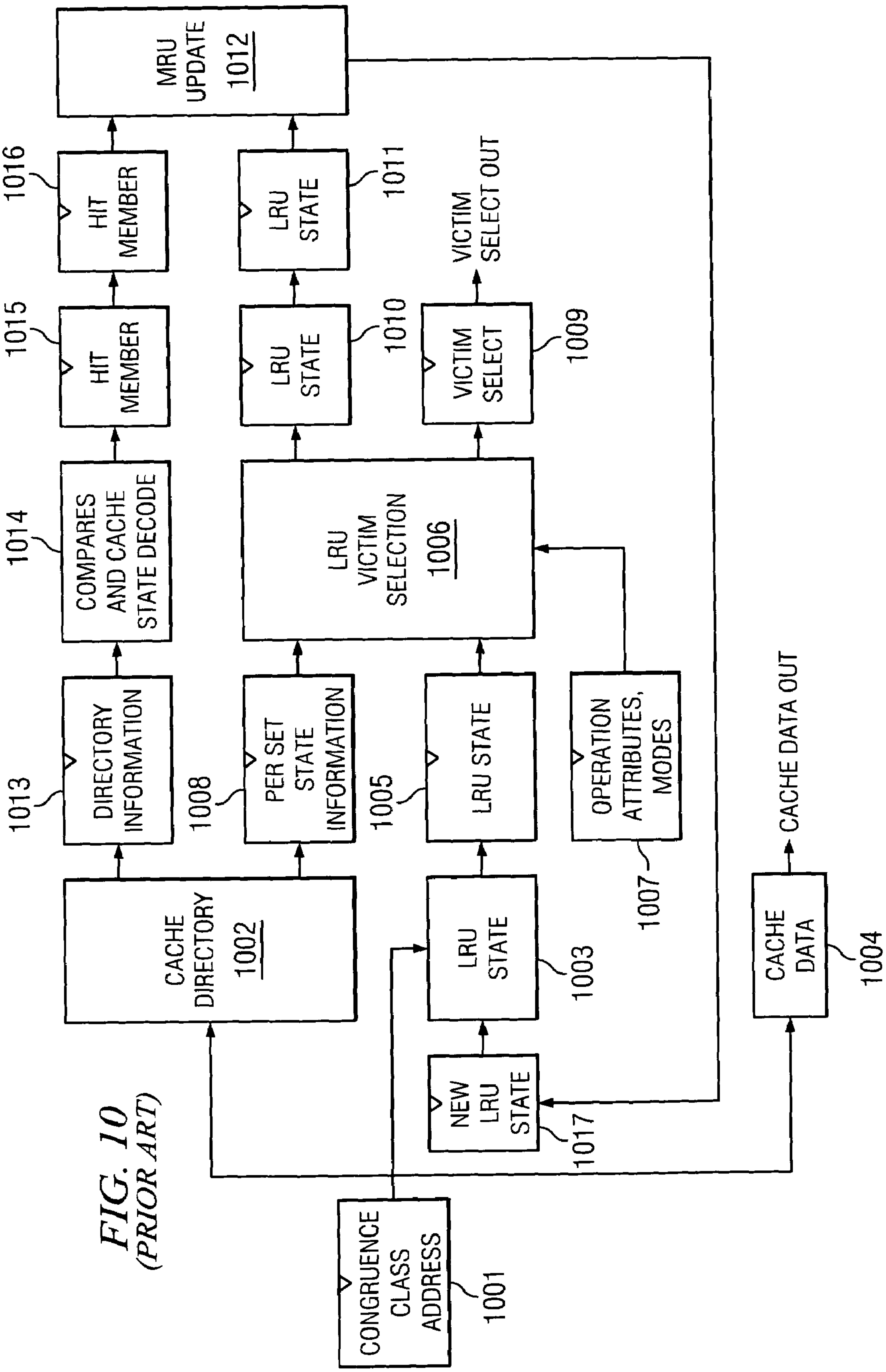
FIG. 10 is a diagram of a known cache architecture.

Referring now to FIG. 10, a cache architecture is illustrated. The cache congruence class index (or address) is held in latch 1001. From there, the address is simultaneously routed to the directory array 1002, the LRU state array 1003, and, for operations which speculatively read the cache, to the data array 1004.

From LRU state array 1003, the state information for the accessed congruence class is read and deposited into latch 1005. The state bits 0 through 12 of LRU tree 750, found in FIG. 7 are an example of such state information.

From staging latch 1005, the LRU state information is routed to least recently used (LRU) victim selection logic 1006, which is comprised largely of LRU victim selection logic such as that shown in circuit diagram 901, found in FIG. 9A and FIG. 9B. This logic always chooses a potential victim, whether one is needed or not. The selected victim member position is deposited in latch 1009. If selected victim was not needed, the LRU state will not be changed accordingly. This function will be described with the MRU update logic.

In addition to speculatively selecting a victim, victim selection logic 1006 also passes along some or all of the LRU state information to MRU update logic 1012, via pipelined latches 1010 and 1011. For implementations which cannot selectively write some bits to a given entry in LRU state array 1003, while leaving other bits in that entry unchanged, latches 1010 and 1011 must convey all the LRU state information (since all bits will be written when the array is updated). For implementations which can selectively write some bits to an entry in array 1003, while leaving other bits in that entry unchanged, latches 1010 and 1011 need only an indication of which member was selected as a victim.

A subset of the attributes of an operation and/or static mode switch settings is placed in latch 1007. From there, it is routed to LRU victim select logic 1006, which may be augmented by a set of operational modes and possibly by one or more congruence class partitioning policies, well known to those of ordinary skill in the art.

Referring once again to FIG. 10, the least recently used victim selection logic 1006 may also be augmented by an invalid member select override policy. The invalid member select override policy makes use of cache member state information typically found in the cache directory 1002. A subset of the coherency state information (e.g., the valid bit) for all the members in the congruence class (indexed by 1001) is read from the directory 1002 and placed in latch 1008. From there, it is routed to the LRU victim select logic 1006, which may be augmented by an invalid member select override policy.

Referring once again to FIG. 10, the MRU update logic 1012 receives a pipelined indication of which member was speculatively selected as a potential victim from staging latch 1011. Meanwhile, the contents of the associated congruence class lookup in the directory 1002 were latched 1013 and routed to the compare and decode logic 1014.

The compare and decode logic 1014 determines whether the operation is a cache hit, and if so, which member in the congruence class is the hit member. This logic also determines whether or not the operation must be aborted due to a collision with a protected resource, or due to a permission conflict between the operation type and the coherence state of the cache line.

The "hit member" information indicates one of the following: no operation occurred (either there was no operation at that time or the operation was aborted), a cache miss occurred, or a cache hit occurred against a given member position. The "hit member" information is deposited into latch 1015, and pipelined forward to latch 1016, from which it is routed to the MRU update logic 1012.

In the MRU update logic 1012, the following information is collected for a given operation: whether or not an operation occurred (from latch 1016); if it occurred, whether the operation was a hit or miss (from latch 1016); if it was a hit, which member position contained the cache line that was hit (from latch 1016); if it was a miss, which member position was chosen to allocate the new cache line (from latch 1011).

If no operation occurred, the LRU state will remain unchanged. If a hit operation occurred, the LRU state will be updated such that the hit member position is established as MRU. If a miss operation occurred, the LRU state will be updated such that the allocated member position is established as MRU. Circuit diagram 801 in FIG. 8 shows an example implementation of this MRU update function.

The updated LRU state information is deposited in latch 1017, poised for writeback into the LRU state array 1003. For implementations which cannot selectively write some bits to a given entry in the LRU state array 1003, while leaving other bits in that entry unchanged, latch 1017 holds the entire contents of the entry to be written into the array. It must convey all the LRU state information (since all bits will be written when the array is updated). For implementations which can selectively write some bits to an entry in array 1003, while leaving other bits in that entry unchanged, latch 1017 consists of a write enable mask (indicating which bits of the entry will be written), as well as a vector of update bit values (for bits that will be written according to the mask).

Those of ordinary skill in the art will recognize the following properties. The state information for the invalid member selection override exists in the directory 1002. As caches grow larger (affecting size of data array 1004, directory array 1002, and LRU state array 1003), the latency through a directory 1002 and to the victim selection logic 1006 grows relative to the latency through the LRU state array 1003 to the victim selection logic 1006. Also, the circuit complexity (and latency) grows beyond what is shown in circuit diagram 901 of FIG. 9A and FIG. 9B. Increases in the aggressiveness of processor operating frequencies compound this latency difference, making it more and more difficult to balance the desire to select a victim early with difference in latency between early arriving LRU state info (from latch 1005) and ever-later arriving invalid cache state info (from latch 1008).

Figure 12:
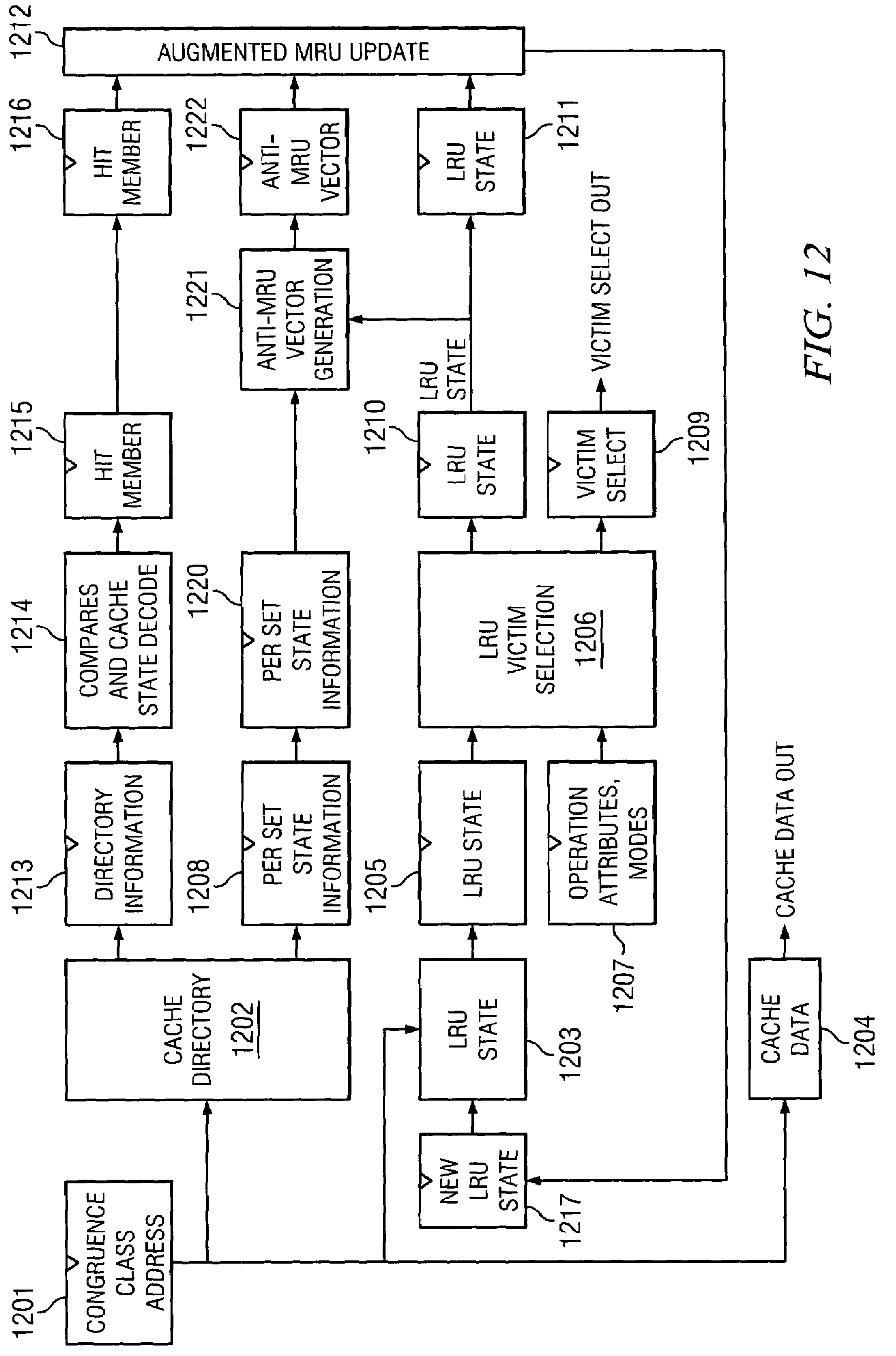
FIG. 12 is a cache architecture including LRU augmentations for biasing Invalid members for LRU victim selection.

Referring now to FIG. 12, a cache architecture including LRU augmentations for biasing I states as LRU is depicted. In this example, the cache congruence class index (or address) is held in latch 1201. From there, the address is simultaneously routed to the directory array 1202, the LRU state array 1203, and, for operations which speculatively read the cache, to the data array 1204.

From LRU state array 1203, the state information for the accessed congruence class is read and deposited into latch 1205. The state bits 0 through 12 of LRU tree 750, found in FIG. 7 are an example of such state information.

From staging latch 1205, the LRU state information is routed to least recently used (LRU) victim selection logic 1206, which is comprised largely of LRU victim selection logic such as that shown in circuit diagram 901, found in FIG. 9A and FIG. 9B. This logic always chooses a potential victim, whether one is needed or not. The selected victim member position is deposited in latch 1209. If selected victim was not needed, the LRU state will not be changed accordingly. This function will be described with the MRU update logic.

In addition to speculatively selecting a victim, victim selection logic 1206 also passes along some or all of the LRU state information to MRU update logic 1212, via pipelined latches 1210 and 1211. For implementations which cannot selectively write some bits to a given entry in LRU state array 1203, while leaving other bits in that entry unchanged, latches 1210 and 1211 must convey all the LRU state information (since all bits will be written when the array is updated). For implementations which can selectively write some bits to an entry in array 1203, while leaving other bits in that entry unchanged, latches 1210 and 1211 need only an indication of which member was selected as a victim.

A subset of the attributes of an operation and/or static mode switch settings are placed in latch 1207. From there, it is routed to LRU victim select logic 1206, which may be augmented by a set of operational modes and possibly by one or more congruence class partitioning policies.

To avoid the circuit timing challenges imposed by the invalid member select override policy described in FIG. 10, the mechanism utilizes invalid member information to bias the LRU state when an LRU state update occurs, not during victim selection. This process was the focus of related patent application Ser. No. 10/425,459, which has previously been incorporated herein.

To this purpose, the cache line valid information read from the directory 1202 and placed in latch 1208, is no longer routed to the victim select logic 1206. Rather the invalid member select override policy is removed altogether from victim select logic 1206.

Instead, the information from latch 1208 is pipelined through latch 1220 to the anti-MRU vector generation logic 1221. This information consists of a vector (from latch 1220) comprised of one bit per member in the congruence class. For each member, the bit indicates whether or not the member is valid, with a "1" value indicating that the cache line in a given member position is valid, and a "0" value indicating that the cache line in a given member position is not valid (i.e., desirable for replacement).

The LRU state vector (from latch 1210) is also routed to the anti-MRU vector generation logic 1221. From this state vector, the victim member selected by logic 1206 is determined.

An anti-MRU vector is generated by altering the informational vector from latch 1220 in the following manner: All of the bits in the informational vector from latch 1220 are passed unchanged to the anti-MRU vector, with the exception of the bit corresponding to the victim member (as indicated in the LRU state vector information from latch 1210). This particular bit in the anti-MRU vector is set to a "1" value. This will prevent the update logic from biasing the allocated member (which should be marked as MRU) with an anti-MRU update.

The anti-MRU vector is deposited in latch 1222, from which it is routed to the augmented MRU update logic 1212.

In addition, the augmented MRU update logic 1212 receives a pipelined indication of which member was speculatively selected as a potential victim from staging latch 1211. Meanwhile, the contents of the associated congruence class lookup in the directory 1202 were latched 1213 and routed to the compare and decode logic 1214.

The compare and decode logic 1214 determines whether the operation is a cache hit, and if so, which member in the congruence class is the hit member. It also determines whether or not the operation must be aborted due to a collision with a protected resource, or due to a permission conflict between the operation type and the coherence state of the cache line.

The "hit member" information indicates one of the following: no operation occurred (either there was no operation at that time or the operation was aborted), a cache miss occurred, or a cache hit occurred against a given member position. The "hit member" information is deposited into latch 1215, and pipelined forward to latch 1216, from which it is routed to MRU update logic 1212.

In augmented MRU update logic 1212, the following information is collected for a given operation: whether or not an operation occurred (from latch 1216); if it occurred, the anti-MRU vector (from latch 1222); if it occurred, whether the operation was a hit or miss (from latch 1216); if it was a hit, which member position contained the cache line that was hit (from latch 1216); if it was a miss, which member position was chosen to allocate the new cache line (from latch 1211).

If no operation occurred, the LRU state will remain unchanged. If a hit operation occurred, the LRU state will be updated such that the hit member position is established as MRU. If a miss operation occurred, the LRU state will be updated such that the allocated member position is established as MRU.

In addition, if any operation occurred, an "anti-MRU" update occurs for each member in the congruence class indicated by the anti-MRU vector. The anti-MRU update performs the opposite function as an MRU update. While an MRU-update reorders one member with respect to all other members, establishing that one member as the most favored, an anti-MRU update reorders one member with respect to all other members, establishing that one member as the least favored.

MRU update logic 1212 takes advantage of a property of chronology vectors, which property allows multiple update operations to be carried out upon a chronology vector simultaneously. Utilizing this property, the MRU update function performs one MRU-update and multiple "anti-MRU" updates simultaneously.

Of course, given the definition of these operations, their behavior can only be defined as occurring in some particular order relative to one another. When taking advantage of chronology vectors to perform multiple updates simultaneously, the ordering is biased either toward "1" encodings (set-dominant) or "0" encodings (reset-dominant).

In these examples, cache directory 1202 is read for both hits and misses. An MRU update by augmented MRU update logic 1212 occurs in both cases. As a result, an anti-MRU bias for a given congruence class may be performed for any hit or miss to that congruence class.

Referring once again to FIG. 12 the updated LRU state information is deposited in latch 1217, poised for writeback into the LRU state array 1203. For implementations which cannot selectively write some bits to a given entry in the LRU state array 1203, while leaving other bits in that entry unchanged, latch 1217 holds the entire contents of the entry to be written into the array. It must convey all of the LRU state information (since all bits will be written when the array is updated). For implementations which can selectively write some bits to an entry in array 1203, while leaving other bits in that entry unchanged, latch 1217 consists of a write enable mask (indicating which bits of the entry will be written), as well as a vector of update bit values (for bits that will be written according to the mask).

Avoiding Cast Out on Bad Victim Select and Recycling Victim Select Operation

During the victim selection process, certain conditions lead to the selection of "victims" that are undesirable and/or lead to an error condition (e.g., selection of one of the various combinations of chronology state bits (per FIG. 17) that does not map to an actual member of the congruence class or selected of a member in the deleted state). The process by which either a D-state member or an unassigned combination of LRU state bits is selected by LRU selection logic is collectively referred to "bad victim" selection.

The present invention provides a method, apparatus, and computer for identifying bad victim selection during LRU victim selection process and recovering from such bad victim selection without causing the system to crash or suspend forward progress of the victim selection process. The invention enables recovery from selection of a deleted member or of a combination of chronology state bits that do not map to a member in the congruence class.

Figure 14A:
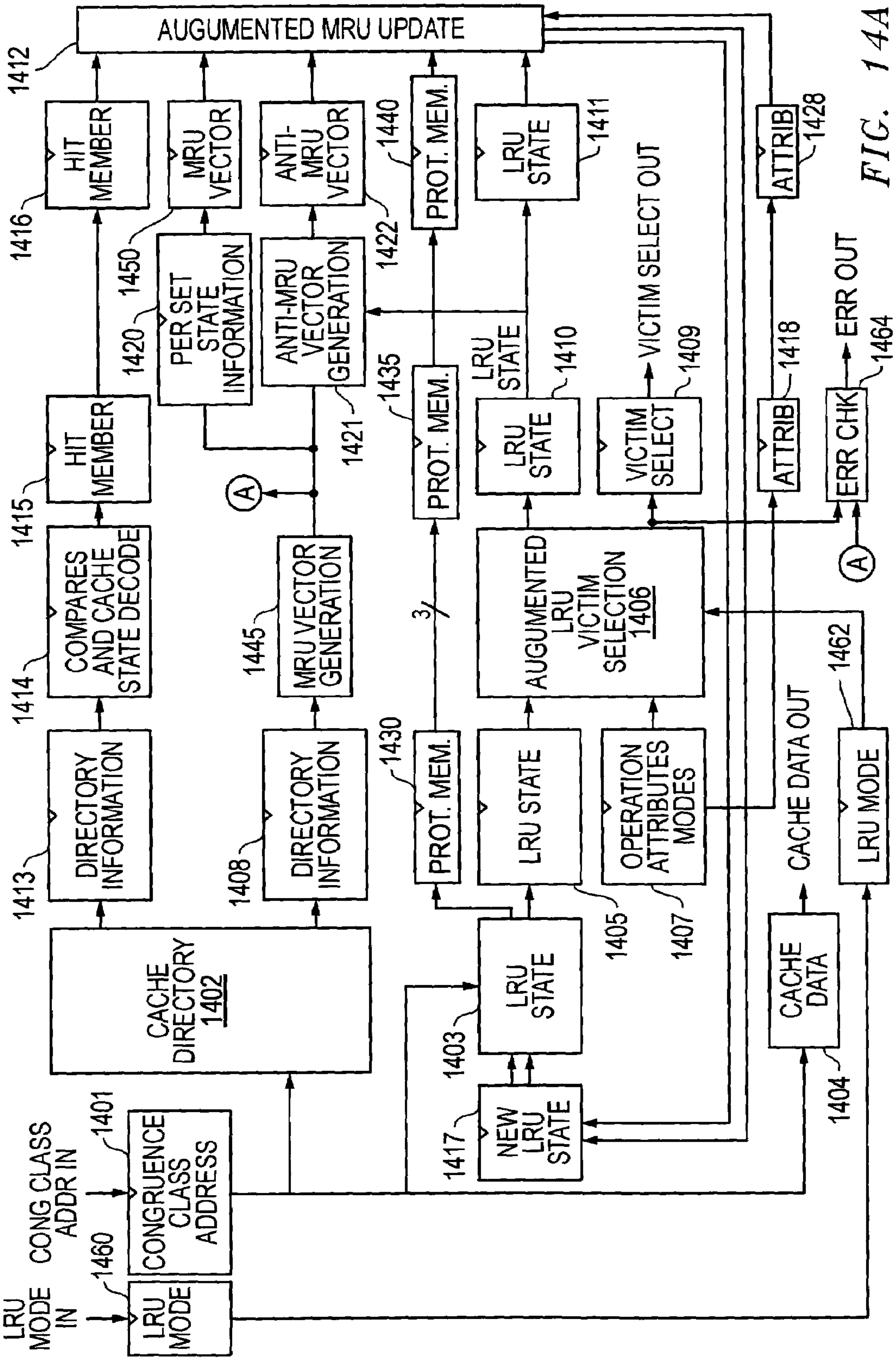
FIG. 14A is a cache architecture that includes logic components for handling bad victim selection while performing LRU victim selection and other functions in accordance with an illustrative embodiment of the present invention.

With reference now to FIG. 14A, there is illustrated a block diagram representation of a cache architecture expanded to include pipelines for processing the member protection bits, I-state biasing to LRU, and D-state MRU steerage. Each of the above processes have been individually described in the above referenced and incorporated patent application Ser. Nos. 11/850,388, 11/951,783, and 11/054, 067. A description of the biasing of I states is provided above, accompanying the description of FIG. 12.

Several additional components are provided to enable detection of bad victim selection and recycling of the victim selection process when a bad victim selection is detected. Since the above features related to specific logic blocks and associated processes of FIG. 14A have previously been described in the respective applications, only these logic blocks and processes relevant to the enhancements illustrated within FIG. 14A are given detailed coverage in the following descriptions of FIG. 14A.

LRU State Bits

One aspect of the invention focuses on bad victims caused by errors within the LRU state array 1203 configured with entries (per congruence class) made up of thirteen (13) state bits 1102. These thirteen state bits correspond to the chronology vectors (1 bit directional root vector, two 6 bits chronology vectors) referenced in the above description of FIG. 7, that order an 8 member congruence class for LRU victim selection, as described above.

Additionally, as described in related patent application Ser. No. 11/054,390, several member protection bits may also be included within the LRU state array of FIG. 14A. The functionality of member protection bits and process related thereto are covered within the related patent, and are not given any further coverage herein.

As previously mentioned, augmented LRU victim selection logic 1406 receives the 13 LRU state bits as a chronology vector that points to a particular member of the congruence class. Each of the 13 bits has a value of 0 or 1, and the combination of values for each bits maps collectively to one member that is selected as the victim member.

The 13 state bits are passed through augmented LRU victim selection logic 1406, which generates an N-bit victim vector that indicates which one of the 8 members is the victim member. Within the N bit victim vector, a member is identified as the victim member by having the particular bit (0, 1, 2, etc.) associated with the victim member set to logic high (1), while all other bits are set logic low (0).

The output of LRU victim selection logic 1406 is thus expected to have a single bit set during each iteration of the victim selection process. However, as occasionally occurs within caching mechanisms, a fault is introduced into the chronology vector and results in an "error" combination of state bits (e.g., other than the 24 valid permutations) that do not point to one of the members as a victim.

When the combination of chronology bits is not one that identifies (or is assigned to) a particular member, the LRU victim selection logic 1406 generates an N-bit null output vector (i.e., all 0s). The method and apparatus of the present invention enable such conditions to be tolerated within the victim selection process.

With specific reference now to the FIG. 14, similar to the above description of FIG. 12, the cache congruence class index (or address) is held in latch 1401. From there, the address is simultaneously routed to the directory array 1402, the LRU state array 1403, and, for operations which speculatively read the cache, to the data array 1404.

From LRU state array 1403, the 13 state bits for the accessed congruence class is read and deposited into latch 1405, then forwarded to victim selection logic 1406. Contemporaneously with forwarding the 13 state bits to latch 1405, LRU mode input is released from LRU mode latch 1460 and placed in mode latch 1462. From mode latch 1462, LRU mode input is fed into victim selection logic 1406.

Victim selection logic 1406 selects an initial victim (via mechanisms/processes similar to that described above) and the victim vector identifying the selected victim member is deposited in latch 1409. During normal operation (i.e., when the selected victim member is not a bad victim), victim selection logic 1406 then passes along some or all of the LRU state information to MRU update logic 1412, via pipelined latches 1410 and 1411. Functional operation of MRU update logic 1412 is provided in the related patent applications, and not relevant to the present invention.

D-state Selection

As introduced in the background, special handling of members tagged with the D state is required during LRU victim selection because of the potential for the D state to be selected as a victim and crash the system. References to one such handling of members in D states have been provided in the related patent application, incorporated herein by reference.

One aspect of the present invention provides an improved method and apparatus for preventing selection of Deleted (D) members as an LRU victim during pipelined operations for LRU victim selection at the LRU victim selection logic. During each cache access targeting the particular congruence class, the deleted cache line is identified from information in the cache directory. A location of a deleted cache line is identified and provided within LRU victim selection pipeline. The invention provides a different handling of deleted members, which handling is not dependent on a first cycling through to bias against selecting members in the D-state. The invention recognizes that even when biased as MRU, for example, a flipped bit in the LRU state bits may still lead to selection of a member in the D-state as the LRU victim member.

Referring again to FIG. 14A, during each cache access, cache directory 1402 is read for deletions in addition to hits, misses and invalid states. A deleted member is identified within the cache directory 1202 and the D-state member-identifying information is pipelined through set state latch 1408 to MRU vector generation logic 1445.

Vector generation logic 1445 takes the information received from latch 1408 and generates a D-state vector (referred to as D-state MRU vector in the related application), which is forwarded to latch 1420 and then latch 1450. D-state vector comprises one bit per member in the congruence class. For each member, the bit indicates whether or not the member is deleted, with a "0" value indicating that the cache line in a given member position is operational (not deleted), and a "1" value indicating that the cache line in the given member position is deleted.

The pipelining of D-state information and generation of D-state MRU vector is completed contemporaneously with pipelining of LRU state bits to the LRU victim selection logic. The information provided within set state information latch 1408 indicates/provides all information about a set, including both whether the member is tagged with an I state or whether the member is tagged with a D state, etc.

Detection and Handling of Bad Victims

According to the invention, an analysis is completed on the output vector of LRU victim select logic 1406 to determine if no member was selected as a victim (i.e., a null output vector) or if a deleted member was selected as the victim. When either condition occurs, the current victim selection process is aborted, the resulting output vector discarded, and a next victim selection process is initiated with a randomly generated combination of vector bits identifying a randomly selected member as the victim. The randomly selected victim member is utilized in place of the member identified by the LRU state bits from LRU state array 1403.

Additional logic is provided within cache architecture and LRU selection logic to enable this abort and restart of the victim selection process with a random selection of the victim member. Key among the added logic is an LRU mode mechanism (not shown) with LRU mode latches 1460, 1462.

As shown by FIG. 14A, augmented LRU victim selection logic 1406 receives an additional input, referred to herein as LRU mode input, via mode latches 1460 and 1462. LRU mode mechanism provides an LRU mode input via latches 1460 and 1462 that connects to augmented LRU victim selection logic 1406. LRU mode input controls the selection, within the LRU victim selection logic 1403, of either the LRU state bits (from LRU state array 1403) or a victim vector that represents a randomly selected member.

According to one embodiment, LRU mode mechanism is connected to the output from error checking logic 1464 (logic 1 or 0), indicating whether the victim selection process was a success (good victim) or failure (bad victim). A description of one embodiment of error checking logic 1464 is provided below with reference to FIG. 4C. According to the embodiment, the LRU mode input received from LRU mode latch 1462 is a logic high (1) when a bad victim was previously selected (i.e., following the abort and restart condition during the previous attempt at LRU victim selection). A logic high LRU mode input triggers selection of a random victim vector during a subsequent victim selection. When a good victim is selected, however, the LRU mode input bit is a logic low (0), enabling subsequent selection of a victim using the LRU state bits. Also, when a bad victim selection occurs, the control mechanism of LRU victim selection logic 1406 is triggered to restart the victim selection process, and the selection is affected by the current value of the LRU mode input.

Thus, during the subsequent restart, the value of the LRU mode input forces a selection of randomly generated victim vector over the victim identified by the combination of LRU state bits from the LRU state array 1403. In one embodiment, the randomly generated victim identifying vector is a random combination of values for the LRU state bits (13 bits in the present embodiment). In another embodiment, described herein, the randomly generated victim vector is an N bit vector (representing the N possible members of the congruence class) with a single one of the N bits toggled logic high indicating the particular (randomly selected) member that is to be selected as the victim.

Figure 13A:
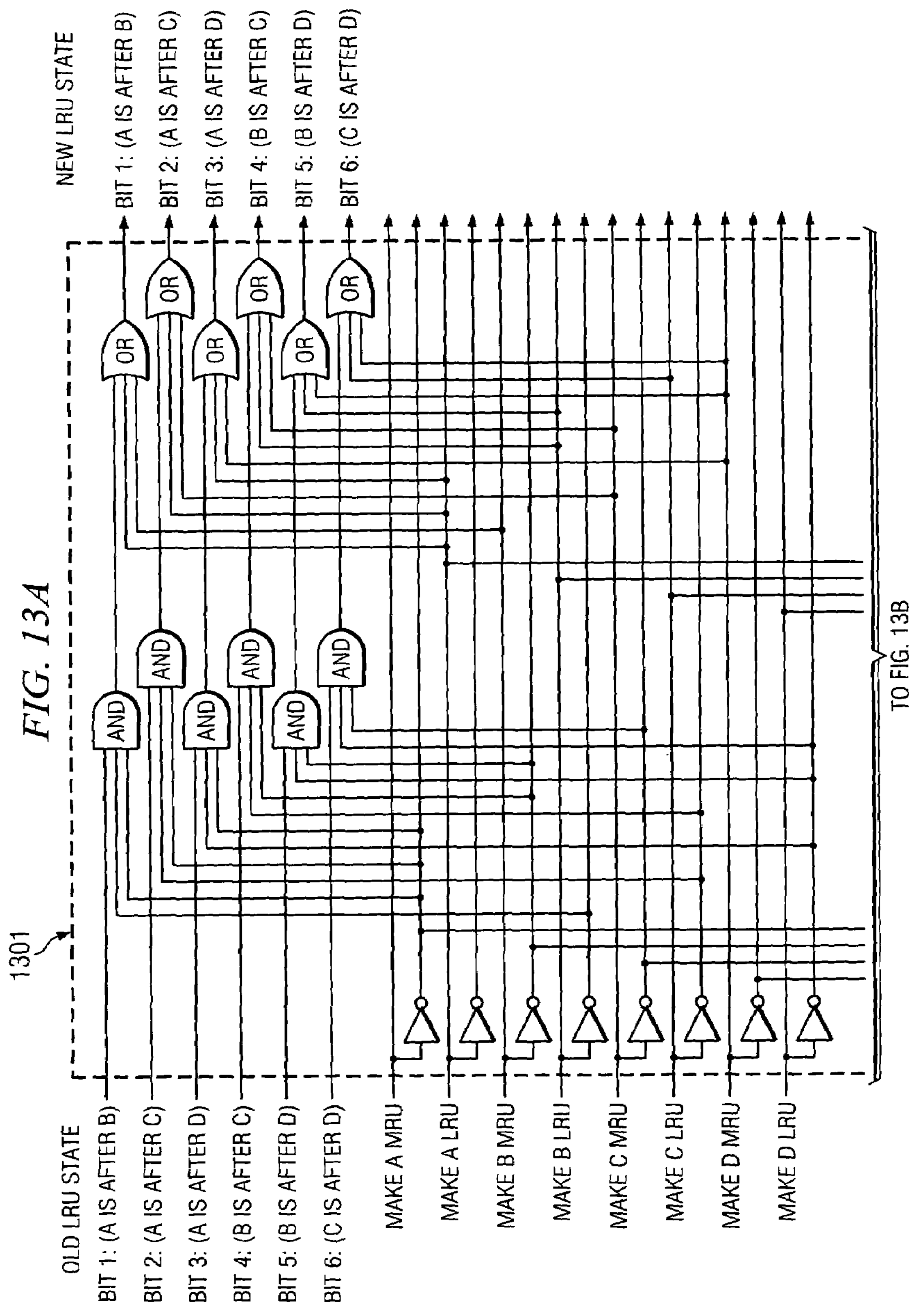
FIG. 13 is a flow chart of the process of using LRU mode data to determine whether to initiate normal or random LRU victim selection according to one embodiment of the invention.
Figure 13B:
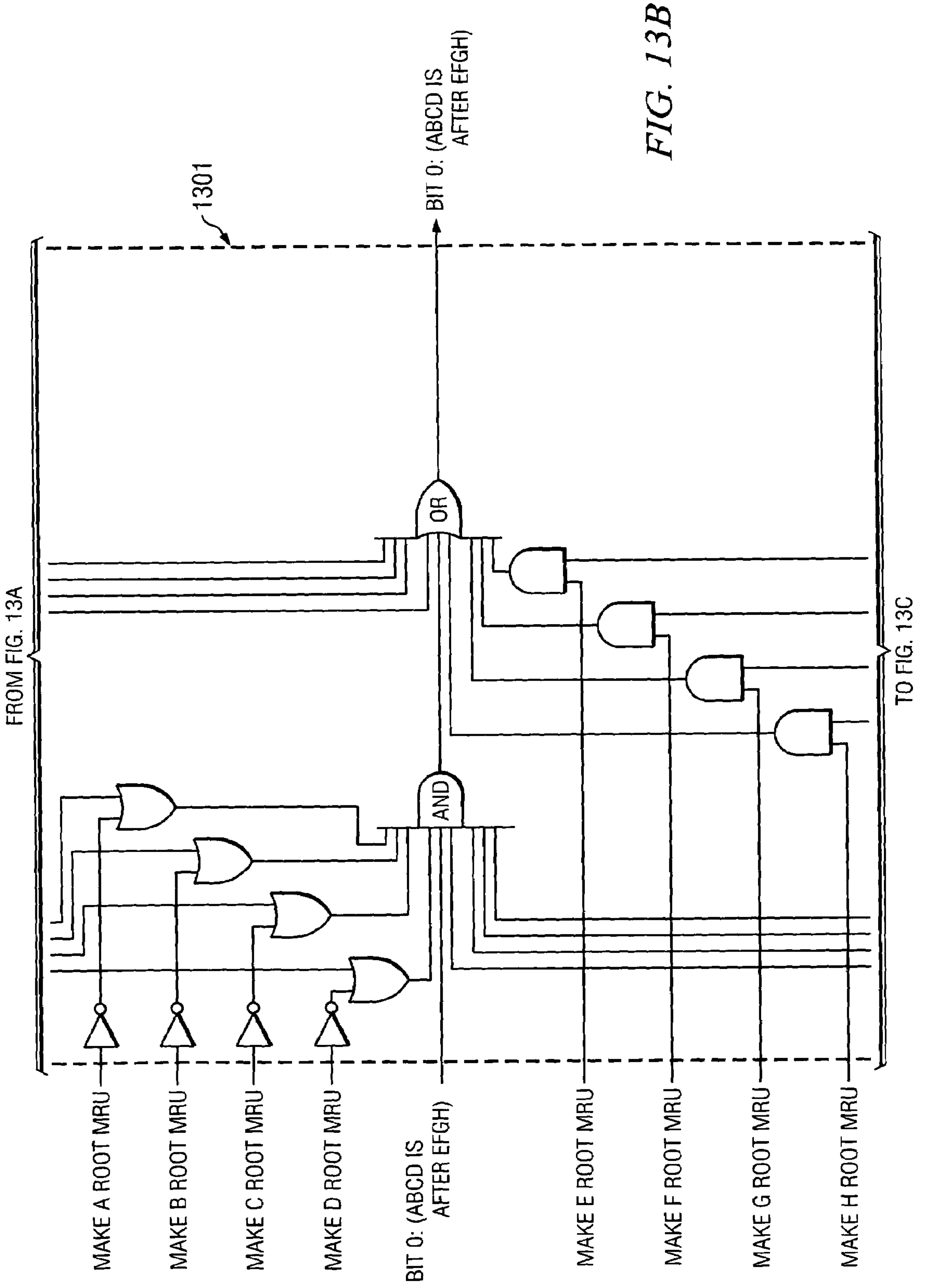
Figure 13C:
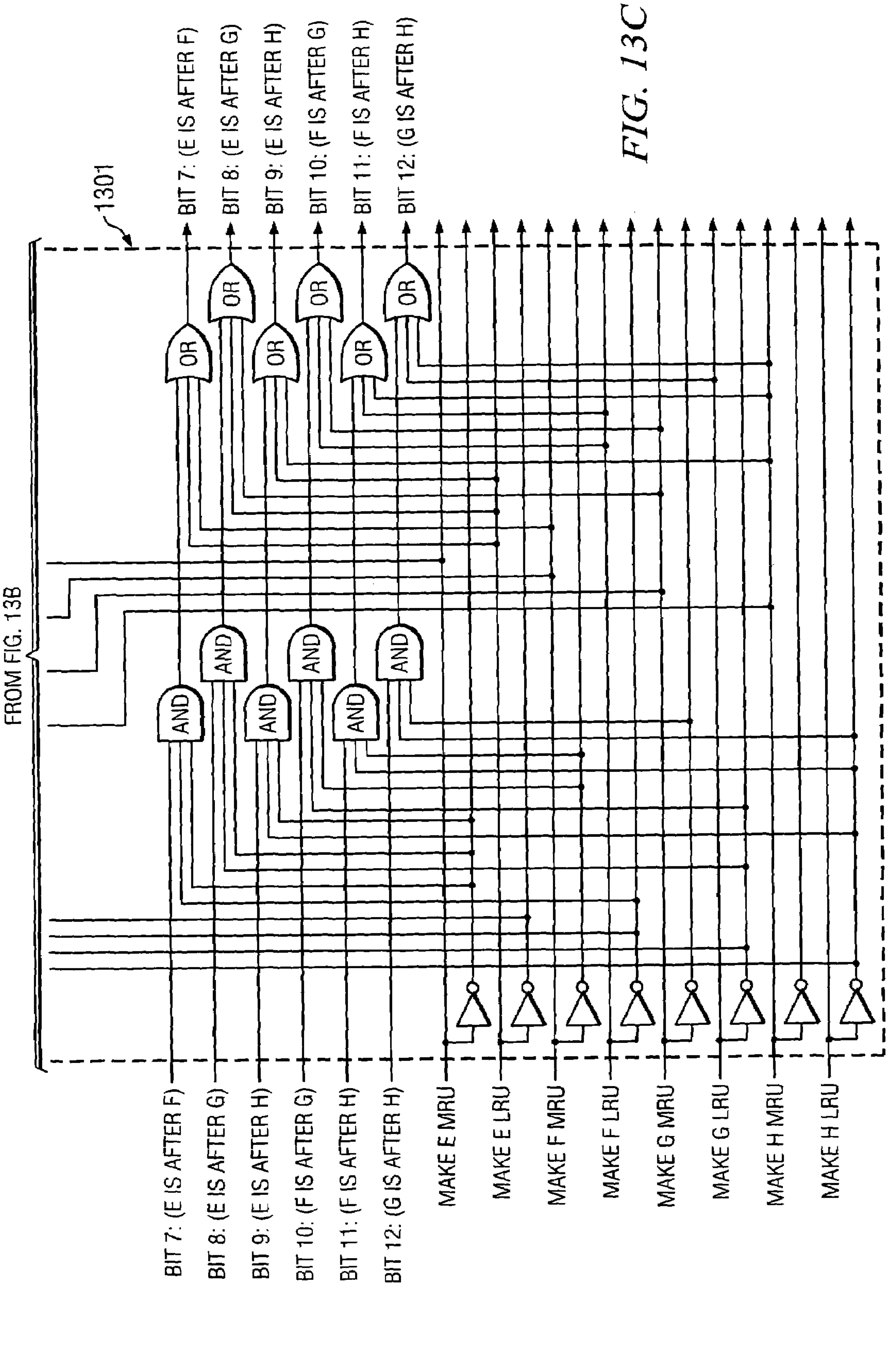

In one embodiment, the victim vector overrides any previous biasing, etc., of particular members since this biasing may have influenced the previous bad victim selection. The random selection of this victim is only triggered when the previous selection process produced a bad victim, as shown by FIG. 13. Randomly selecting a victim is thus a key part of the recycling through the victim selection process to avert similar faults while selecting a different victim.

Figure 14B:
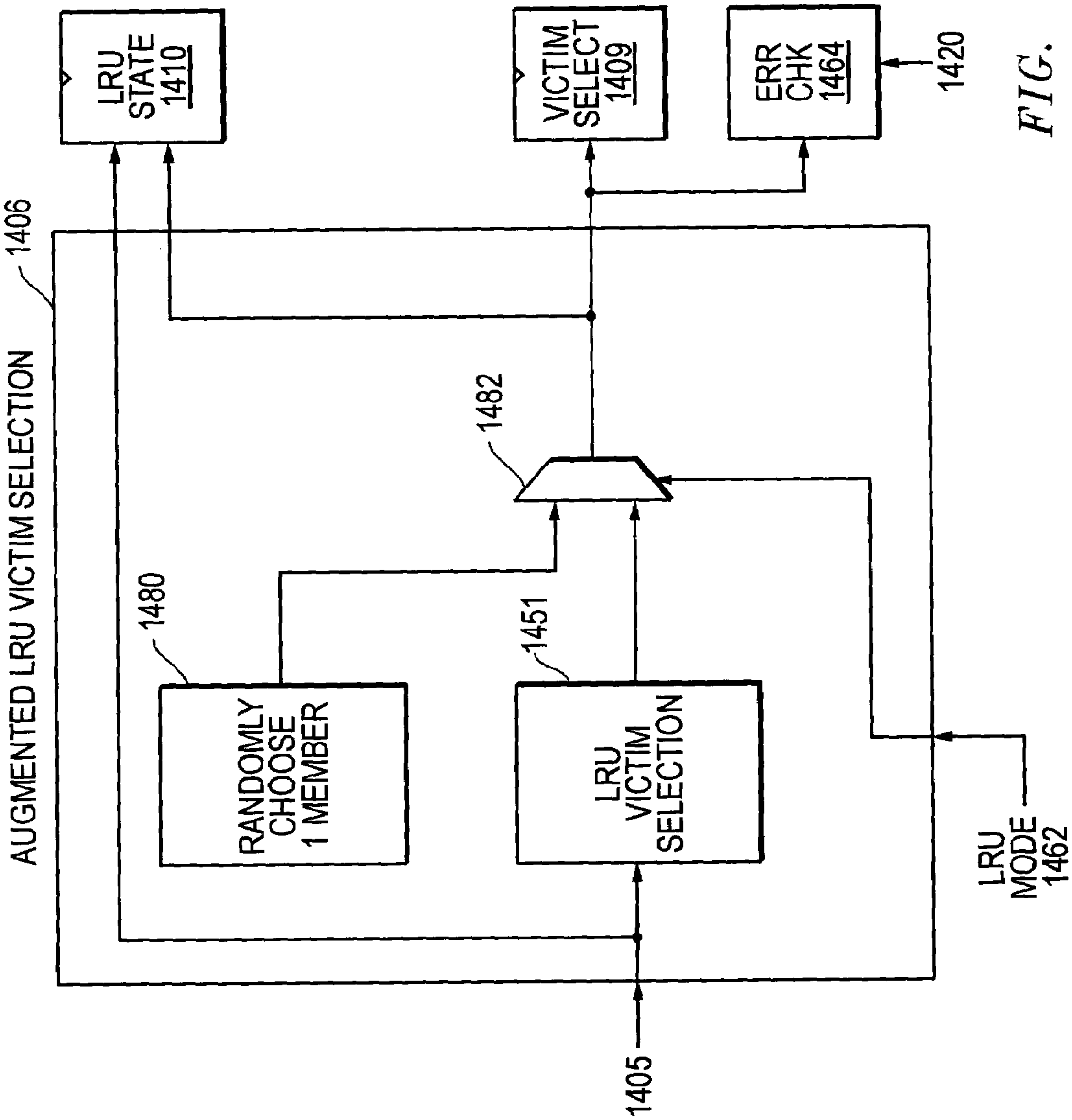
FIG. 14B is a block diagram illustrating components of an augmented LRU victim selection logic that enables recycling of victim selection process when a previous process results in selection of a bad victim, in accordance with one embodiment of the invention.
Figure 14C:
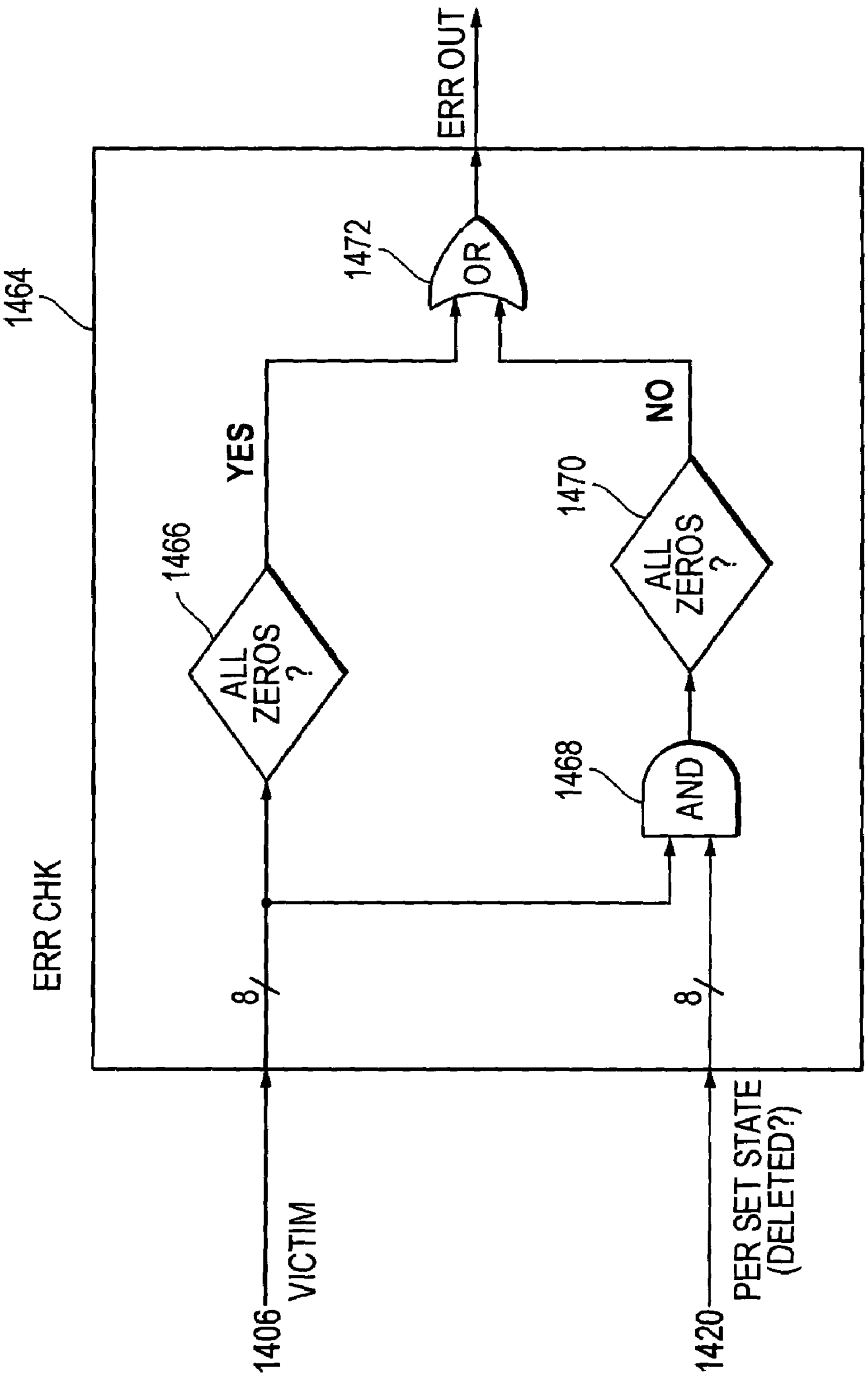
FIG. 14C is a block diagram illustrating components of error checking logic used for determining when a bad victim has been selected according to one embodiment of the invention.

The flow chart of FIG. 13 illustrates the use of different values for LRU mode input based on occurrence of an error (i.e., selection of a bad victim) when performing LRU victim selection using the logic flows of FIGS. 14A, 14B, and 14C. An operation is loaded into the cache mechanism at block 1302, and the logic of FIGS. 14A and 14B is invoked with the congruence class and LRU mode set to normal (e.g., LRU mode input=0). The normal setting of LRU mode input indicates that the current LRU victim selection process is not a result of a previous bad victim selection. A determination is made at block 1306 whether an error condition (i.e., bad victim selection) occurs while performing the LRU victim selection process. This determination is made by logic illustrated within FIG. 14C, as described below.

If there is no error, the victim selection using the LRU state bits (representing one of the 24 valid permutations) is allowed to continue to completion, as shown at block 1310, and the next LRU victim is selected and its location stored via the LRU state bits in the LRU state array. A no-error determination also indicates that the selected victim is not a deleted member.

If, however, an error condition is registered (i.e., a bad victim selection occurs), then LRU victim selection process is restarted, and FIGS. 14A and 14B are invoked with the congruence class and with LRU mode set to random (e.g., LRU mode input=1), as shown at block 1308. With LRU mode set to random, the LRU victim selection logic selects as victim the member indicated by the randomly generated victim vector. The randomly selected victim is then passed through the error checking process (block 1706). This process of recycling and randomly picking a victim is repeated until a good victim is eventually selected.

Thus, the error (bad victim select) recovery mechanism provided by the invention includes both recycling on bad victim select and random selection of a next victim. In the illustrative embodiment, the above process is applied to recovering from the selection of a deleted member. When a deleted member is accidentally picked, the logic responds similarly to receiving a null vector (due to LRU state bits not pointing to a member). In one embodiment, selection of a member in the deleted state may be caused by a valid combination of state bits being affected by an alpha particle flipping the value of one or more of the bits to provide a resulting combination (among the 24 valid states) that identifies the deleted member.

Because, the combination of bits pointing to a deleted member is one of the valid combinations, an additional comparison is provided per set state information to determine whether the selected victim member is a deleted member. If the selected victim is a deleted member, then the process of recycling the victim selection process and randomly picking a victim is initiated.

In extreme cases, all but one of the members of a congruence may be deleted (i.e., 7 of the 8 members are in the D-state) or the bits in the LRU state array are stuck to an arbitrary bad value. In these cases, the recycling and picking of random victims, as provided by the invention, still allows for forward progress in LRU victim selection. In one embodiment, the recycling is only completed a pre-set number of times before the system is alerted that the victim selection logic is unable to find a good victim (e.g., all members are in the D-state).

Returning to FIG. 14A, in addition to the LRU state bits, the augmented LRU victim selection logic 1406 also receives the LRU mode input from latch 1462. One embodiment of the selection of an LRU victim using these inputs are illustrated via the logic components of FIG. 14B, which is now described.

Augmented LRU victim selection logic 1406 includes therein LRU victim selection algorithm 1451, which receives the LRU state bits from latch 1405. LRU state bits are passed via separate path through LRU victim selection logic 1406 to LRU state latch 1410. LRU victim selection algorithm 1451 selects a particular victim, identified by the incoming LRU state bits and forwards the vector identifying the selected victim to MUX 1482. MUX 1482 receives a second vector input from random member selection generator 1480 (or random victim vector generator), which randomly selects one of the members of the congruence class for allocation as the LRU victim. LRU mode input (from latch 1462) operates as the select input for MUX 1482 and thus determines which of the two vector inputs to MUX 1482 is selected as the output victim vector.

According to the illustrative embodiment, random victim vector generator 1480 always generates a random combination of bits of an 8-bit vector during each victim selection cycle. The random combination is a random selection/setting of one of the N bits as logic high (1), while all other bits of the vector remain logic low (0). However, when the generated random vector is not selected, the output vector is discarded and another random victim vector is generated during the next iteration. The N-bit output vector from MUX 1482 is sent to both LRU state latch 1410 and victim select latch 1409.

At this stage in the pipeline process, a selected victim should have been identified based on the values encoded within the LRU victim vector that is stored within latches 1409 and 1410. However, there is not yet any confirmation/indication whether the LRU victim selection logic 1406 was successful in picking a victim with a valid (non-null) vector and/or one that is not a deleted member. Thus, contemporaneously with the latching of the output victim vector at LRU state latch 1410 and victim select latch 1409, a copy of the output victim vector from MUX 1482 is forwarded to error checking logic 1464.

The determination of validity of the output victim vector from augmented LRU victim selection logic 1406 is completed by error checking logic 1464. As shown by FIG. 14C, error checking logic 1464 comprises several logic components that together complete the checks for bad victim selection caused by either the selection of a deleted member or failure to select one of the 24 valid states among the 64 possible combinations/permutations of LRU state bits.

In addition to the output vector, error checking logic 1464 also receives as input the D-state vector from D-state vector generation logic 1445. D-state vector (or per set information) indicates which, if any, of the members of the set are deleted.

The N bit vector representing the selected victim (the output from MUX 1482) is received as input into a first zero determining logic 1466, which checks whether the N-bit vector contains all zeroes (i.e., a null vector). A null vector indicates that a bad victim was selected, as each selection of a good victim results in a non-null output vector. The N-bit output vector also represents one input into AND gate 1468, whose second input is the D-state vector.

AND gate 1468 combines the N-bit output vector and the D-state vector to provide a single output vector, which includes a bit set to logic high (1) when the selected victim member, if any, is also a deleted member. The combined output vector from AND gate 1468 is passed to a second zero determining logic 1470 that determines whether or not the value of all bits in the combined vector is zero, indicating that the selected victim member, if any, is not a deleted member. The output from second zero determining logic 1470 and the output of first zero determining logic 1466 are ORed together at OR gate 1472, and OR gate 1472 provides and error out signal indicating if a bad victim has been selected. The error out signal is passed back to LRU mode generation mechanism (not specifically shown) to influence the selection of the next victim member.

Finally, in one embodiment, error out signal is fed back to augmented LRU victim selection logic 1406 to force LRU victim selection logic to re-start the victim selection process. When the error out signal indicates that a bad victim selection has occurred, the signal triggers the LRU mode mechanism to initiate the selection of the randomly generated vector within augmented LRU victim selection logic 1406 during the subsequent recycling of LRU victim selection process. Error out signal may also be fed to additional logic (not specifically shown), which triggers the discarding of output vectors, respectively stored in victim select latch 1409 and LRU state latch 1410/1411.

As a final matter, it is important to note that while an illustrative embodiment of the present invention has been, and will continue to be, described in the context of a fully functional computer system with installed management software, those skilled in the art will appreciate that the software aspects of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable type media such as floppy disks, hard disk drives, CD ROMs, and transmission type media such as digital and analogue communication links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. In a memory component, a method comprising:

selecting a least recently used (LRU) victim member from among a congruence class; and determining whether the LRU victim member is a bad victim;

responding to a selection of a bad victim by:

triggering a selection of a next victim member from the congruence class in place of the bad victim member;

issuing an LRU mode select input to trigger the LRU victim selection logic to issue the randomly selected member as the victim member, wherein the LRU mode select input defaults to allow a selection of the victim member indicated by the LRU state bits when the victim member is not a bad victim; and restarting the LRU victim selection logic to select a new victim member from the congruence class when the previous selection resulted in selection of a bad victim.

2. The method of claim 1, further comprising:

at an LRU victim selection logic, receiving from an LRU state array a plurality of LRU state bits indicating a least recently used member of the congruence class;

initially selecting the member indicated as LRU by the LRU state bits as the LRU victim member; and outputting an LRU victim vector identifying the location of the LRU victim member.

3. The method of claim 2, further comprising:

randomly selecting a member to assign as the LRU victim member; and selecting the next LRU victim from among the randomly selected member and the member that is indicated by the LRU state bits.

4. The method of claim 3, further comprising discarding a victim vector outputted from the LRU victim selection logic when the victim vector points to a bad victim.

5. The method of claim 3, further comprising:

determining when the selected victim member is a bad victim, said bad victim being one of a faulty member within a cache line that does not provide proper caching operation, a deleted member, and a phantom member indicated by the LRU state bits when the LRU state bits do not point to one of the members of the congruence class.

6. The method of claim 3, wherein said determining comprises:

determining when a victim vector outputted from the LRU victim selection logic does not point to any of the members in the congruence class;

determining when the victim vector is a faulty member, such as a deleted member; and triggering a restart of the victim selection process at the LRU victim selection logic when either comparison yields a positive results.

* * * * *